US009747669B2

(12) United States Patent
Mizuno

(10) Patent No.: US 9,747,669 B2
(45) Date of Patent: Aug. 29, 2017

(54) IMAGE PROCESSING APPARATUS AND IMAGE PROCESSING METHOD

(71) Applicant: MegaChips Corporation, Osaka-shi (JP)

(72) Inventor: Yusuke Mizuno, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 97 days.

(21) Appl. No.: 14/243,085

(22) Filed: Apr. 2, 2014

(65) Prior Publication Data

US 2014/0307972 A1    Oct. 16, 2014

(30) Foreign Application Priority Data

Apr. 12, 2013  (JP) ................. 2013-083758

(51) Int. Cl.
*G06K 9/46*  (2006.01)
*G06T 5/00*  (2006.01)
(Continued)

(52) U.S. Cl.
CPC ............... *G06T 5/002* (2013.01); *G06T 5/10* (2013.01); *G06T 5/20* (2013.01); *G06T 2207/20064* (2013.01)

(58) Field of Classification Search
None
See application file for complete search history.

(56) References Cited

U.S. PATENT DOCUMENTS 6,775,412 B1   8/2004  Nister et al.

7,792,376 B2   9/2010  Mizuno
(Continued)

FOREIGN PATENT DOCUMENTS

JP       2001-520466    10/2001
JP       2002-94991      3/2002
(Continued)

OTHER PUBLICATIONS

"Information technology—JPEG 2000 image coding system: Core coding system", International Telecommunication Union, Telecommunication Standardization Sector of ITU, T.800 (Aug. 2002), ITU-T Recommendation T.800, 209 pages.

(Continued)

*Primary Examiner* — Fred Hu
(74) *Attorney, Agent, or Firm* — Oblon, McClelland, Maier & Neustadt, L.L.P.

(57) ABSTRACT

A WT unit performs wavelet transformation on original image data to generate first image data. An ROI developing unit, based on ROI information, specifies an ROI corresponding portion corresponding to an ROI and a non-ROI corresponding portion corresponding to a non-ROI to the first image data. A high-frequency cutting unit performs, on the first image data, a high-frequency cutting process that cuts a high-frequency component of the non-ROI corresponding portion. A low-frequency blurring unit performs, on the first image data, a low-frequency blurring process that blurs a low-frequency component of the non-ROI corresponding portion. The IWT unit performs inverse wavelet transformation on second image data (first image data obtained after the high-frequency cutting process and the low-frequency blurring process are performed) to generate third image data.

20 Claims, 15 Drawing Sheets

(51) Int. Cl.
G06T 5/10 (2006.01)
G06T 5/20 (2006.01)

(56) References Cited

U.S. PATENT DOCUMENTS

| | | |
|---|---|---|
| 8,649,599 B2 | 2/2014 | Yamada |
| 9,165,344 B2 | 10/2015 | Zhang et al. |
| 2004/0264794 A1 | 12/2004 | Nister et al. |
| 2005/0271290 A1 | 12/2005 | Nister et al. |
| 2006/0228034 A1 | 10/2006 | Mizuno et al. |
| 2013/0243279 A1 | 9/2013 | Zhang et al. |

FOREIGN PATENT DOCUMENTS

| | | |
|---|---|---|
| JP | 2002094991 A * | 3/2002 |
| JP | 2003-248673 | 9/2003 |
| JP | 2006-014121 A | 1/2006 |
| JP | 2006-203409 | 8/2006 |
| JP | 2006-295299 | 10/2006 |
| JP | 2008-245033 | 10/2008 |
| JP | 2011-34178 | 2/2011 |
| JP | 2013-065302 A | 4/2013 |
| WO | WO 99/19839 | 4/1999 |

OTHER PUBLICATIONS

Japanese Office Action dated Mar. 14, 2017, issued in Japanese Patent Application No. 2013-083758 (with English translation).

* cited by examiner

F I G . 3
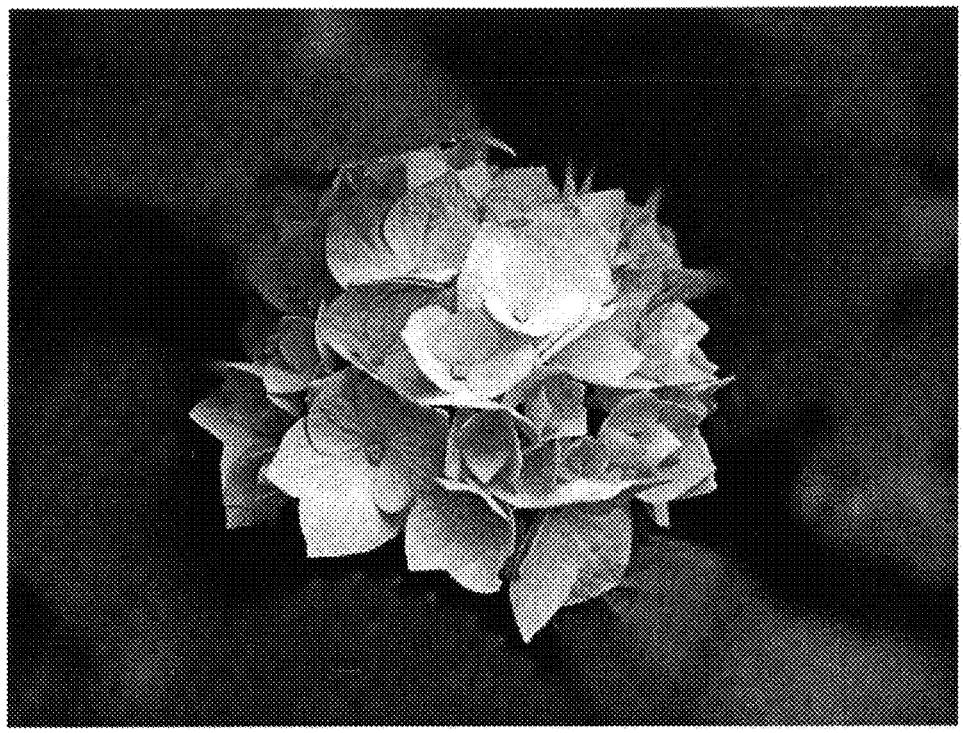
F I G . 4
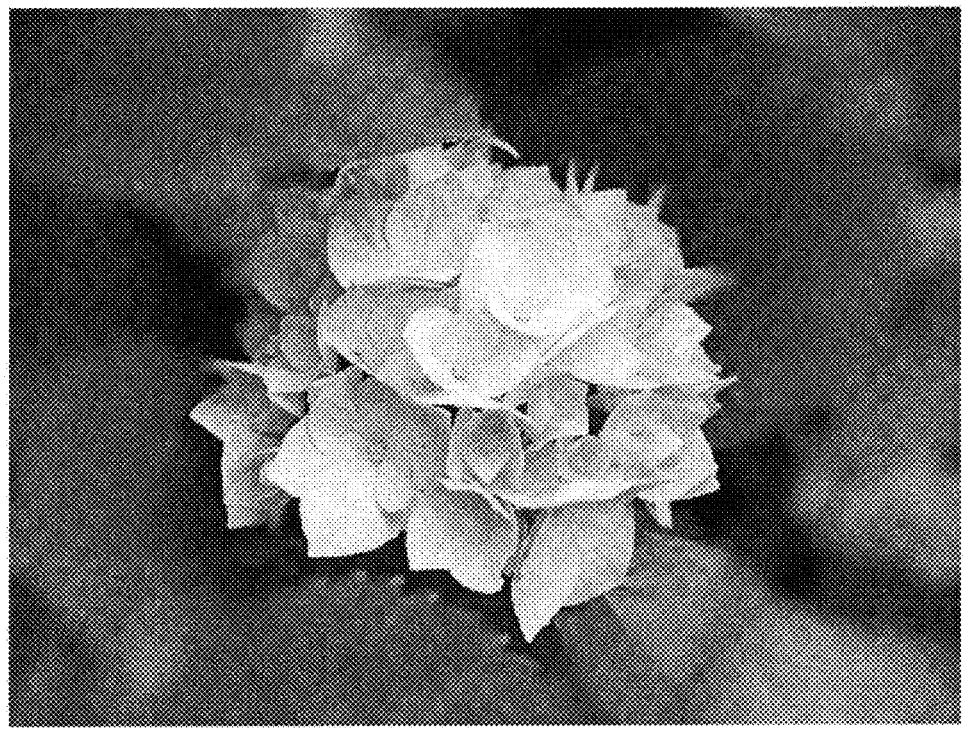

F I G . 7
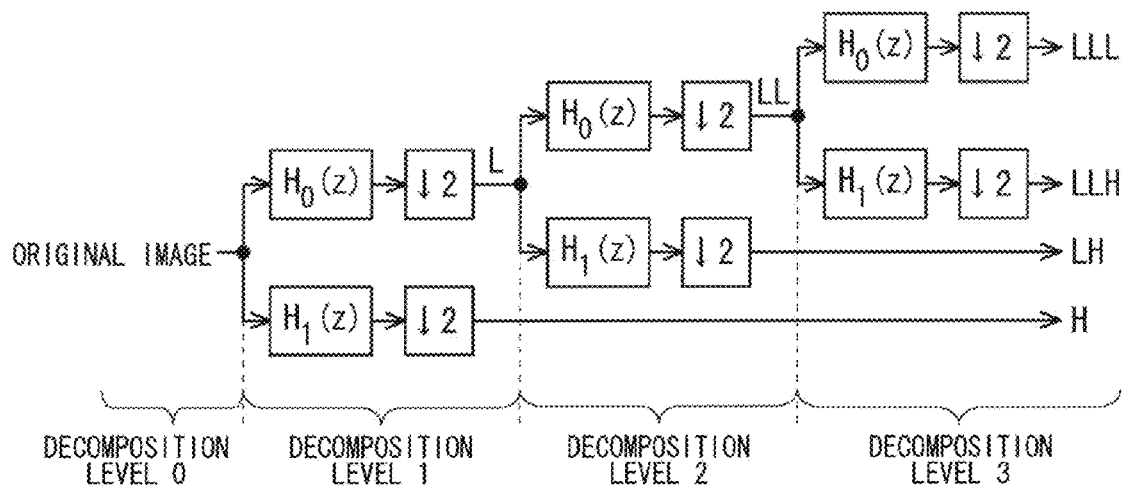
F I G . 8
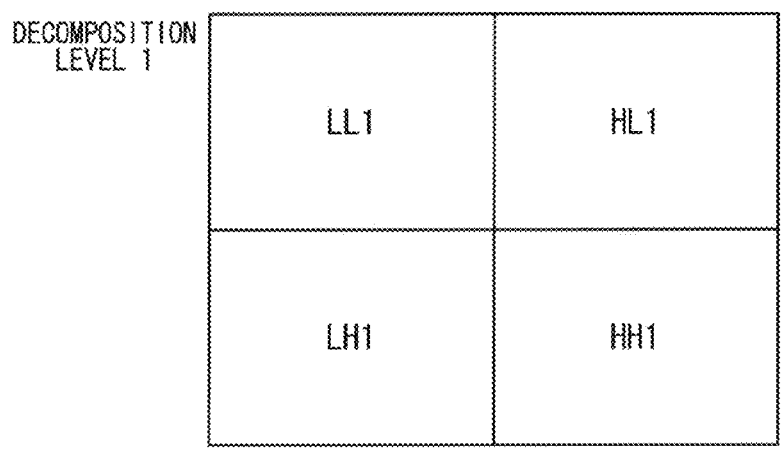
F I G . 9
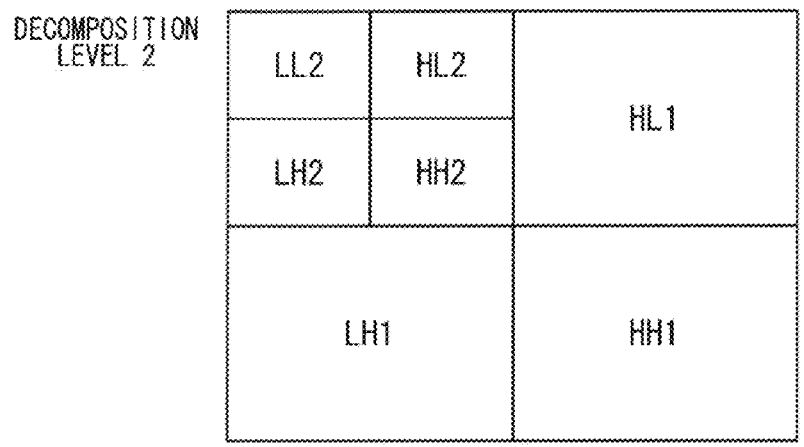

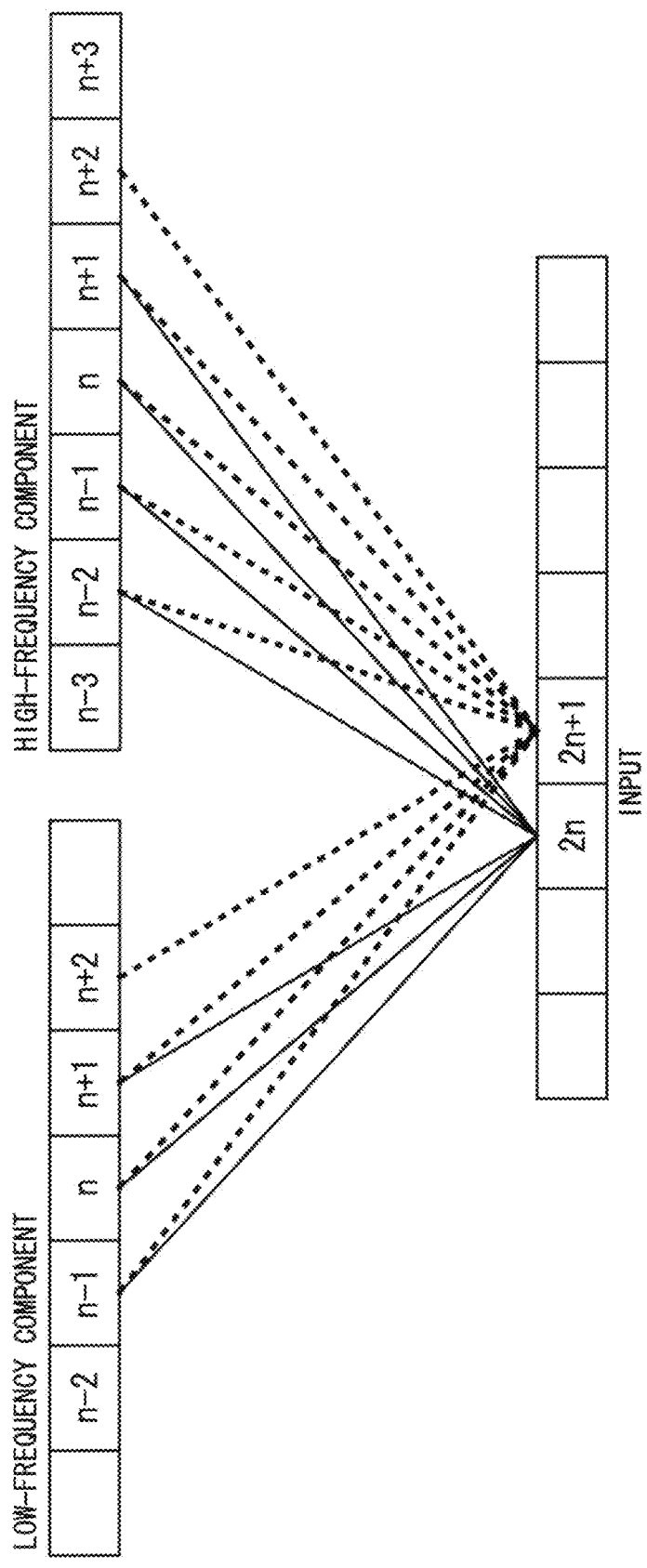

F I G . 1 7

| $\frac{1}{9}$ | $\frac{1}{9}$ | $\frac{1}{9}$ |
|---|---|---|
| $\frac{1}{9}$ | $\frac{1}{9}$ | $\frac{1}{9}$ |
| $\frac{1}{9}$ | $\frac{1}{9}$ | $\frac{1}{9}$ |

F I G . 1 8

| $\frac{1}{25}$ | $\frac{1}{25}$ | $\frac{1}{25}$ | $\frac{1}{25}$ | $\frac{1}{25}$ |
|---|---|---|---|---|
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |
| $\frac{1}{25}$ | $\frac{1}{25}$ | $\frac{1}{25}$ | $\frac{1}{25}$ | $\frac{1}{25}$ |

F I G . 1 9

| $\frac{1}{16}$ | $\frac{2}{16}$ | $\frac{1}{16}$ |
|---|---|---|
| $\frac{2}{16}$ | $\frac{4}{16}$ | $\frac{2}{16}$ |
| $\frac{1}{16}$ | $\frac{2}{16}$ | $\frac{1}{16}$ |

F I G. 2 0

| $\frac{1}{256}$ | $\frac{4}{256}$ | $\frac{6}{256}$ | $\frac{4}{256}$ | $\frac{1}{256}$ |
|---|---|---|---|---|
| $\frac{4}{256}$ | $\frac{16}{256}$ | $\frac{24}{256}$ | $\frac{16}{256}$ | $\frac{4}{256}$ |
| $\frac{6}{256}$ | $\frac{24}{256}$ | $\frac{36}{256}$ | $\frac{24}{256}$ | $\frac{6}{256}$ |
| $\frac{4}{256}$ | $\frac{16}{256}$ | $\frac{24}{256}$ | $\frac{16}{256}$ | $\frac{4}{256}$ |
| $\frac{1}{256}$ | $\frac{4}{256}$ | $\frac{6}{256}$ | $\frac{4}{256}$ | $\frac{1}{256}$ |

F I G . 2 7
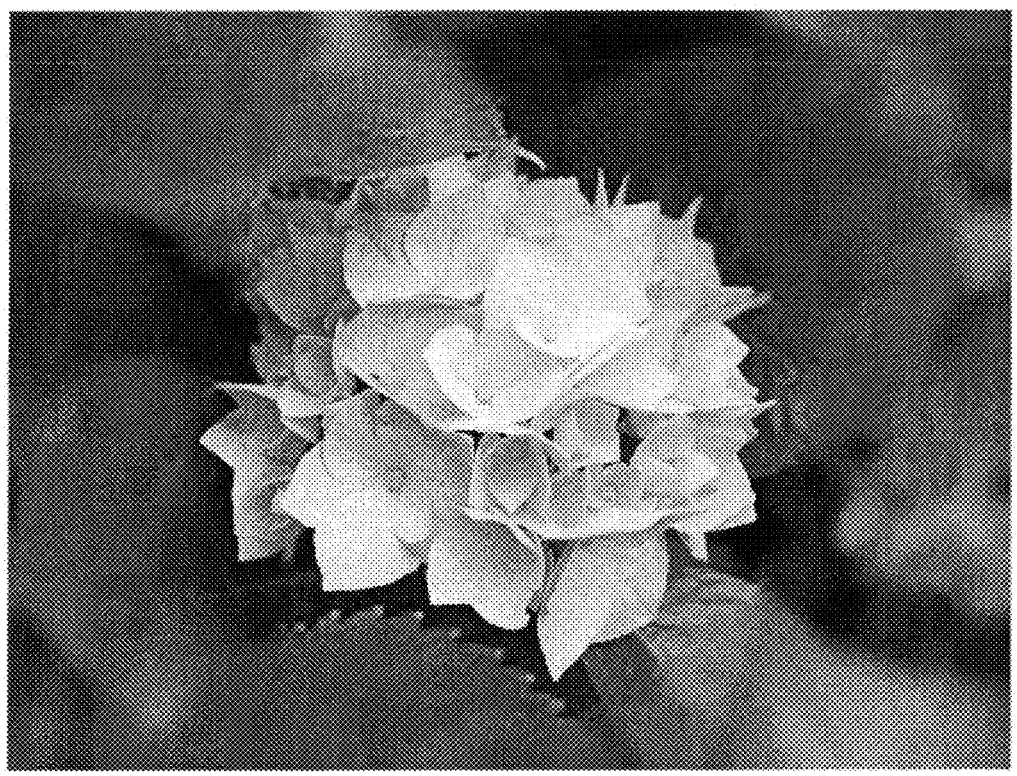
F I G . 2 8
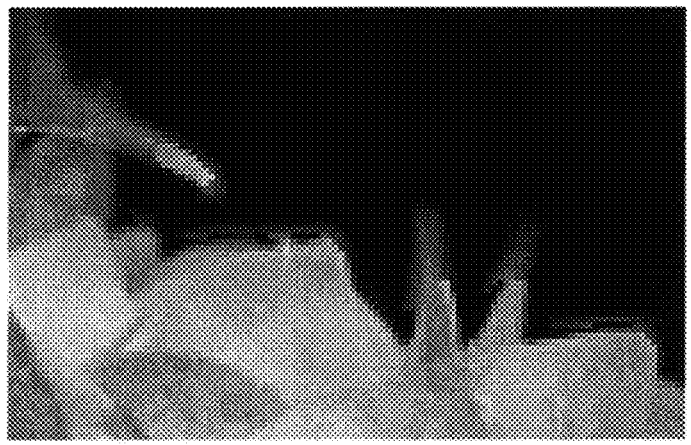

F I G. 2 9

IMAGE PROCESSING APPARATUS AND IMAGE PROCESSING METHOD

BACKGROUND OF THE INVENTION

Field of the Invention

The present invention relates to an image processing apparatus and an image processing method, and specifically, to a technique that partially blurs an original image to generate a blurred image.

Description of the Background Art

In the technique described in Japanese Patent Application Laid-Open No. 2008-245033, a minimum-scale 2-dimensional wavelet coefficient about input image data is calculated. An in-focus state is regarded on coordinates having a wavelet coefficient equal to or larger than a predetermined threshold value, and the wavelet coefficient is kept. In contrast to this, with respect to coordinates having a wavelet coefficient smaller than the predetermined threshold value, a wavelet coefficient of each scale is multiplied by a control coefficient. Thereafter, inverse wavelet transformation is performed to obtain an output image. According to this, it is understood that, while the in-focus state of in-focus coordinates in an input image is kept, an image having a depth of field smaller than that of the input image is obtained.

The techniques described in Japanese Patent Application Laid-Open Nos. 2006-295299, 2006-203409, and 2002-94991 are related to compression encoding such as JPEG 2000 (Joint Photographic Experts Group 2000). In this compression encoding, a relatively larger code amount is allocated to a region of interest (ROI). According to this, it is understood that a pseudo focusing effect that complements a subject by focusing the subject and blurring a background is achieved.

As a method of developing the ROI of an image on a wavelet plane, a method employed in JPEG 2000 is known (see INTERNATIONAL STANDARD ISO/IEC 15444-1 ITU-T RECOMMENDATION T.800 Information technology-JPEG 2000 image coding system: Core coding system Annex H—Coding of images with regions of interest). A technique that determines a specific coefficient belonging to an ROI on a wavelet plane, though the type of the technique is different from that of the wavelet filter employed in JPEG 2000, is disclosed in Japanese Unexamined Patent Application Publication (Translation of PCT application) No. 2001-520466.

As techniques for separating a background from a foreground, a large number of techniques are developed. For example, the technique described in Japanese Patent Application Laid-Open No. 2011-34178 is given.

Various techniques are developed to generate a blurred image by partially blurring an original image.

SUMMARY OF THE INVENTION

It is an object of the present invention to provide a technique that can generate a high-quality blurred image with an approach completely different from the existing techniques.

An image processing apparatus according to a first aspect of the present invention is an image processing apparatus that generates a blurred image by partially blurring an original image, and includes a wavelet transformation unit, an ROI developing unit, a high-frequency cutting unit, a low-frequency blurring unit, and an inverse wavelet transformation unit. The wavelet transformation unit performs wavelet transformation on original image data to generate first image data in which the original image data is decomposed into a low-frequency component and a high-frequency component up to a predetermined decomposition level. The ROI developing unit acquires ROI information in which a region of interest (ROI) serving as an unblurred region and a region of non-interest (non-ROI) serving as a blurred region are regulated in the original image, and develops the ROI information to the first image data by specifying, based on the ROI information, an ROI corresponding portion corresponding to the ROI and a non-ROI corresponding portion corresponding to the non-ROI in the first image data. The high-frequency cutting unit performs, on the first image data, a high-frequency cutting process that cuts the high-frequency component of the non-ROI corresponding portion. The low-frequency blurring unit performs, on the first image data, a low-frequency blurring process that blurs the low-frequency component of the non-ROI corresponding portion. The inverse wavelet transformation unit performs inverse wavelet transformation on second image data to generate third image data, the second image data corresponding to the first image data obtained after the high-frequency cutting process and the low-frequency blurring process are performed.

An image processing apparatus according to a second aspect of the present invention is an image processing apparatus according to the first aspect wherein the low-frequency blurring unit acquires the third image data having a decomposition level that is not 0 from the inverse wavelet transformation unit at least once and performs the low-frequency blurring process on the third image data.

An image processing apparatus according to a third aspect of the present invention is the image processing apparatus according to the first or second aspect wherein the low-frequency blurring unit acquires the third image data having a decomposition level 0 from the inverse wavelet transformation unit, performs the low-frequency blurring process on the third image data, and outputs the third image data obtained after the low-frequency blurring process is performed as data of the blurred image.

An image processing apparatus according to a fourth aspect of the present invention is an image processing apparatus according to any one of the first to third aspects wherein the inverse wavelet transformation unit outputs the low-frequency component of the third image data having a decomposition level that is not 0 as data of the blurred image.

An image processing apparatus according to a fifth aspect of the present invention is an image processing apparatus according to any one of the first to fourth aspects wherein the high-frequency cutting process is a process of setting a data value of the high-frequency component to 0.

An image processing apparatus according to a sixth aspect of the present invention is an image processing apparatus according to any one of the first to fifth aspects wherein the low-frequency blurring unit includes a filter to perform the low-frequency blurring process.

An image processing apparatus according to a seventh aspect of the present invention is the image processing apparatus according to the sixth aspect wherein the filter is a smoothing filter or a Gaussian filter.

An image processing apparatus according to an eighth aspect of the present invention is an image processing apparatus according to any one of the first to seventh aspects wherein the ROI developing unit develops the ROI information to the first image data under the condition in which the high-frequency cutting process and the low-frequency blurring process with respect to the non-ROI corresponding portion do not influence the ROI corresponding portion of the third image data.

An image processing apparatus according to a ninth aspect of the present invention is the image processing apparatus according to the eighth aspect wherein the wavelet transformation unit performs the wavelet transformation by a 5×3 filter in which a 5-tap low-pass filter and a 3-tap high-pass filter are used on a decomposition side. The ROI developing unit, when a 2nth (n is an integer) pixel of the original image is included in the ROI, sets nth data on the low-frequency component and $\{n-1\}$th and nth data on the high-frequency component to the ROI corresponding portion. The ROI developing unit, when a $\{2n+1\}$th pixel of the original image is included in the ROI, sets the nth and $\{n+1\}$th data on the low-frequency component and the $\{n-1\}$th, nth, and $\{n+1\}$th data on the high-frequency component to the ROI corresponding portion.

An image processing apparatus according to a tenth aspect of the present invention is the image processing apparatus according to the eighth aspect wherein the wavelet transformation unit performs the wavelet transformation by a Daubechies 9×7 filter in which a 9-tap low-pass filter and a 7-tap high-pass filter are used on a decomposition side. The ROI developing unit, when a 2nth (n is an integer) pixel of the original image is included in the ROI, sets the $\{n-1\}$th, nth, and $\{n+1\}$th data on the low-frequency component and the $\{n-2\}$th, $\{n-1\}$th, nth, and $\{n+1\}$th data on the high-frequency component to the ROI corresponding portion. The ROI developing unit, when a $\{2n+1\}$th pixel of the original image is included in the ROI, sets the $\{n-1\}$th, nth, $\{n+1\}$th, and $\{n+2\}$ data on the low-frequency component and the $\{n-2\}$th, $\{n-1\}$th, nth, $\{n+1\}$th, and $\{n+2\}$th data on the high-frequency component to the ROI corresponding portion.

An image processing apparatus according to an eleventh aspect of the present invention is an image processing apparatus according to any one of the first to tenth aspects wherein the wavelet transformation unit performs the wavelet transformation by a 9×7 filter or a 5×3 filter.

An image processing apparatus according to a twelfth aspect of the present invention is an image processing apparatus according to any one of the first to eleventh aspects wherein the inverse wavelet transformation unit performs the inverse wavelet transformation by a 9×7 filter or a 5×3 filter.

An image processing method according to a thirteenth aspect of the present invention is an image processing method that generates a blurred image by partially blurring an original image, and includes steps (a) to (e). In the step (a), wavelet transformation is performed on original image data to generate first image data in which the original image data is decomposed into a low-frequency component and a high-frequency component up to a predetermined decomposition level. In the step (b), ROI information in which a region of interest (ROI) serving as an unblurred region and a region of non-interest (non-ROI) serving as a blurred region are regulated in the original image is acquired, and, based on the ROI information, an ROI corresponding portion corresponding to the ROI and a non-ROI corresponding portion corresponding to the non-ROI are specified in the first image data to develop the ROI information to the first image data. In the step (c), a high-frequency cutting process that cuts the high-frequency component of the non-ROI corresponding portion is performed on the first image data. In the step (d), a low-frequency blurring process that blurs the low-frequency component of the non-ROI corresponding portion is performed on the first image data. In the step (e), inverse wavelet transformation is performed on second image data to generate third image data, the second image data corresponding to the first image data obtained after the high-frequency cutting process and the low-frequency blurring process are performed.

An image processing method according to a fourteenth aspect of the present invention is an image processing method according to the thirteenth aspect wherein, in the step (d), the third image data generated in the step (e) and having a decomposition level that is not 0 is acquired at least once and the low-frequency blurring process is performed on the third image data.

An image processing method according to a fifteenth aspect of the present invention is the image processing method according to the thirteenth or fourteenth aspect wherein, in the step (d), the third image data generated in the step (e) and having a decomposition level 0 is acquired, the low-frequency blurring process is performed on the third image data, and the third image data obtained after the low-frequency blurring process is performed is provided as data of the blurred image.

An image processing method according to a sixteenth aspect of the present invention is an image processing method according to any one of the thirteenth to fifteenth aspects wherein, in the step (e), the low-frequency component of the third image data having a decomposition level that is not 0 is provided as data of the blurred image.

An image processing method according to a seventeenth aspect of the present invention is the image processing method according to any one of the thirteenth to sixteenth aspects wherein the high-frequency cutting process is a process of setting a data value of the high-frequency component to 0.

An image processing method according to an eighteenth aspect of the present invention is the image processing method according to any one of the thirteenth to seventeenth aspects wherein, in the step (b), the ROI information is developed to the first image data under the condition in which the high-frequency cutting process and the low-frequency blurring process with respect to the non-ROI corresponding portion do not influence the ROI corresponding portion of the third image data.

An image processing method according to a nineteenth aspect of the present invention is the image processing method according to the eighteenth aspect wherein, in the step (a), the wavelet transformation is performed by a 5×3 filter in which a 5-tap low-pass filter and a 3-tap high-pass filter are used on a decomposition side. The step (b) includes steps (b1) and (b2). In the step (b1), when a 2nth (n is an integer) pixel of the original image is included in the ROI, nth data on the low-frequency component and $\{n-1\}$th and nth data on the high-frequency component are set to the ROI corresponding portion. In the step (b2), when a $\{2n+1\}$th pixel of the original image is included in the ROI, the nth and $\{n+1\}$th data on the low-frequency component and the $\{n-1\}$th, nth, and $\{n+1\}$th data on the high-frequency component are set to the ROI corresponding portion.

An image processing method according to a twentieth aspect of the present invention is the image processing method according to the eighteenth aspect wherein, in the step (a), the wavelet transformation is performed by a Daubechies 9×7 filter in which a 9-tap low-pass filter and a 7-tap high-pass filter are used on a decomposition side. The step (b) includes steps (b1) and (b2). In the step (b1), when a 2nth (n is an integer) pixel of the original image is included in the ROI, the $\{n-1\}$th, nth, and $\{n+1\}$th data on the low-frequency component and the {n−2}th, {n−1}th, nth, and {n+1}th data on the high-frequency component are set to the ROI corresponding portion. In the step (b2), when a {2n+1}th pixel of the original image is included in the ROI, the {n−1}th, nth, {n+1}th, and {n+2}th data on the low-frequency component and the {n−2}th, {n−1}th, nth, {n+1}th, and {n+2}th data on the high-frequency component are set to the ROI corresponding portion.

According to the first to twentieth aspects, a high-quality blurred image can be obtained. A blur condition can be easily adjusted by controlling a decomposition level of wavelet transformation.

Of these aspects, according to the second and fourteenth aspects, a natural blur condition can be achieved near the boundary of an ROI and a non-ROI. The achieved blur condition can be adjusted.

According to the third and fifteenth aspects, a blur condition near the boundary between an ROI and a non-ROI can be made more moderate.

According to the fourth and sixteenth aspects, a blurred image having a size smaller than that of the original image is obtained.

According to the fifth and seventeenth aspects, distortion or the like can be suppressed from occurring in a blurred image, and a higher-quality blurred image can be obtained.

According to the eighth to tenth aspects and the eighteenth to twentieth aspects, an ROI set in the original image can be prevented from being blurred.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram illustrating a blurred image (when a set value of a decomposition level is 3);
FIG. 4 is a diagram of an image obtained by adjusting the brightness of the blurred image in FIG. 3;
FIG. 7 is a diagram illustrating a 2-divided filter bank group to achieve 1-dimensional DWT;
FIG. 8 is a diagram for explaining a mallat-type wavelet plane (decomposition level 1);
FIG. 9 is a diagram for explaining a mallat-type wavelet plane (decomposition level 2);
FIG. 16 is a diagram illustrating development of ROI information when wavelet transformation is performed by using a Daubechies 9×7 filter;
FIG. 17 is a diagram for explaining a blurring operator of a 3×3 smoothing filter;
FIG. 18 is a diagram for explaining a blurring operator of a 5×5 smoothing filter;
FIG. 19 is a diagram for explaining a blurring operator of a 3×3 Gaussian filter;
FIG. 20 is a diagram for explaining a blurring operator of a 5×5 Gaussian filter;
FIG. 27 is a diagram of an image obtained by adjusting the brightness of the comparative blurred image in FIG. 26;
FIG. 28 is a partially enlarged diagram illustrating a blurred image (for comparison) obtained when a filter having a blurring operator is applied to an original image;
and
FIG. 29 is a partially enlarged diagram illustrating a blurred image according to a preferred embodiment (the number of times of decomposition and synthesis is one).

DESCRIPTION OF THE PREFERRED EMBODIMENTS

Figure 1:
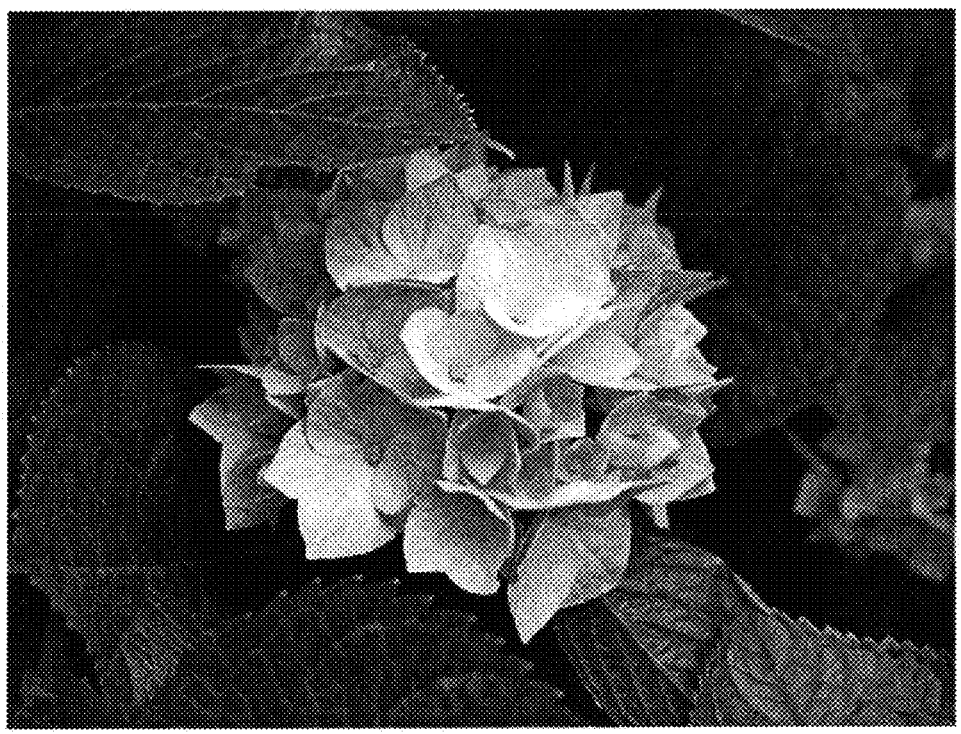
FIG. 1 is a diagram illustrating an original image.
Figure 2:
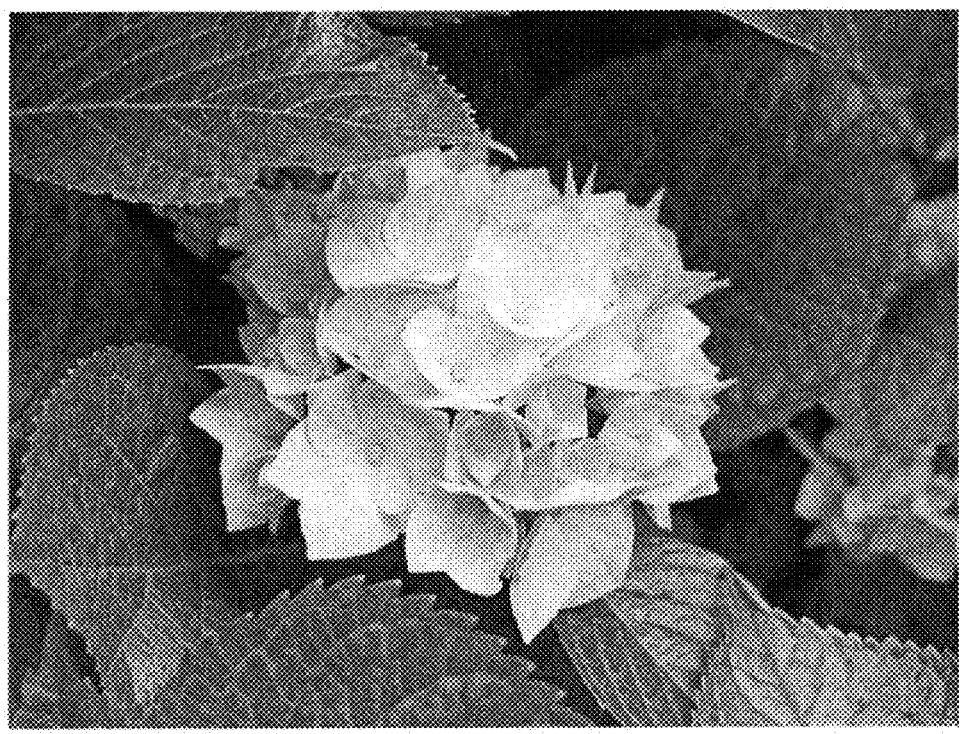
FIG. 2 is a diagram of an image obtained by adjusting the brightness of the original image in FIG. 1.

The present invention provides a technique that partially blurs an original image to generate a blurred image. FIGS. 1 and 2 illustrate an original image. FIG. 2 illustrates an image in which a brightness is adjusted (so-called gamma value is adjusted) to make it easy to watch a dark portion in FIG. 1. FIGS. 3 and 4 illustrate a blurred image. FIG. 4 illustrates an image obtained by performing the same brightness adjustment as that in FIG. 2 on the image in FIG. 3. As is apparent from the comparison of FIGS. 3 and 4 with FIGS. 1 and 2, a leaf region around a flower is mainly blurred in the blurred image. In this case, as the original image, a photograph captured by pan-focus (in other words, a large-depth-of-field photograph) is illustrated. In contrast to this, as the blurred image, a small-depth-of-field photograph in which a flower region is focused is obtained. Specifically, according to the present invention, a depth of field can be pseudoly decreased. However, the present invention can be applied to an image that is not in a pan-focus state. Moreover, the original image may be an image except for a photograph, for example, computer graphics.

Figure 5:
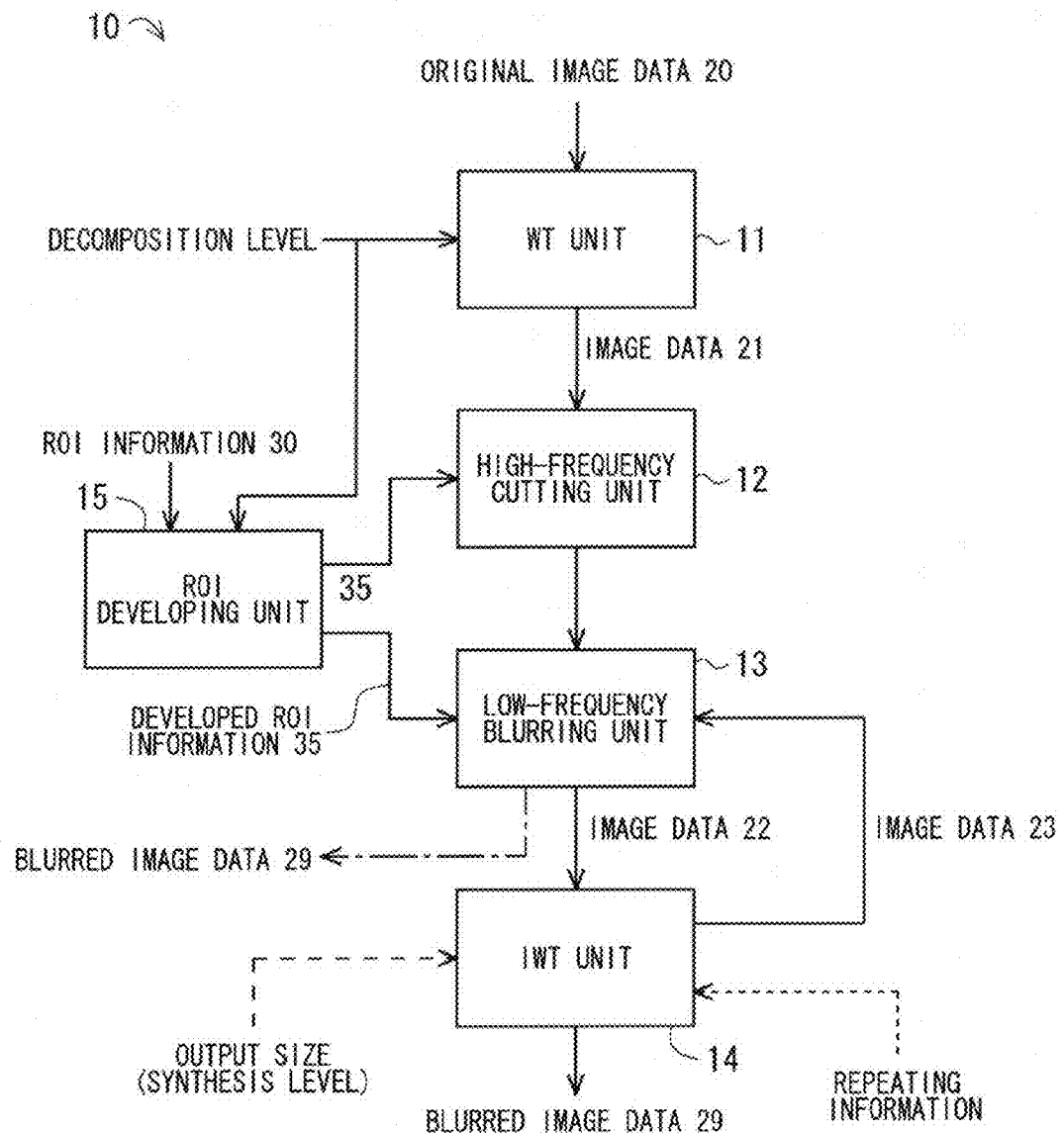
FIG. 5 is a block diagram illustrating an image processing apparatus.

FIG. 5 illustrates a block diagram of an image processing apparatus 10 according to a preferred embodiment of the present invention. According to the example in FIG. 5, the image processing apparatus 10 includes a wavelet transformation unit (also called a WT unit) 11, a high-frequency cutting unit 12, a low-frequency blurring unit 13, an inverse wavelet transformation unit (also called an IWT unit) 14, and a region-of-interest developing unit (also called an ROI developing unit) 15.

<WT Unit 11>

Original image data 20 corresponding to data (digital data) of an original image is input to the WT unit 11. The WT unit 11 performs wavelet transformation (in this case, discrete wavelet transformation (DWT)) on the original image data 20 to generate first image data 21 (may be abbreviated as image data 21). Specifically, the original image data 20 is decomposed into a low-frequency component and a high-frequency component up to a predetermined decomposition level, and result data of the frequency decomposition is the image data 21. The WT unit 11 can be configured by a conventional technique, for example, the techniques described in Japanese Patent Application Laid-Open Nos. 2006-203409, 2002-94991, and 2003-248673.

According to the wavelet transformation, an image to be processed is decomposed into a low-frequency component and a high-frequency component. The decomposition is also called frequency decomposition, band division, or the like. In addition, each of band components (specifically, each of a low-frequency component and a high-frequency component) obtained by the division is also called a sub-band.

Figure 6:
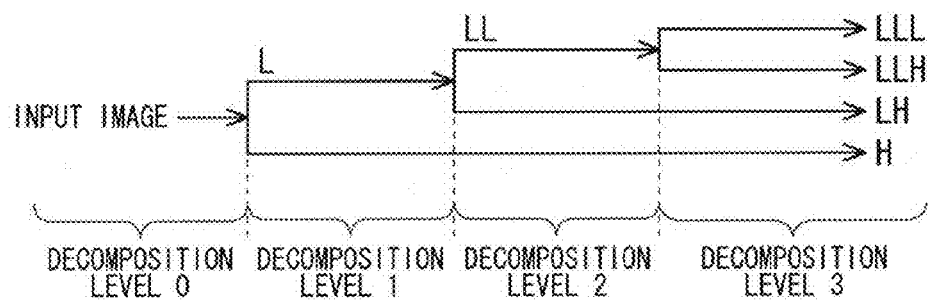
FIG. 6 is a diagram for explaining a mallat-type wavelet packet tree.

As one of typical schemes of wavelet transformation, a mallat type is given. FIG. 6 shows a mallat-type wavelet packet tree about 1-dimensional wavelet transformation.

The mallat type is a scheme that performs frequency division by repeating (in other words, recursively) only low-frequency components on the assumption that a low-frequency component includes an amount of information larger than that of a high-frequency component. The dividing scheme is also called an octave dividing scheme.

Hierarchy expansion, in other words, the number of times of decomposition in wavelet transformation is called a decomposition level. Note that, the number of decomposition levels is not limited to the example in FIG. 6. Herein, a decomposition level in a state before wavelet transformation, specifically, a decomposition level of an original image to be processed is expressed as 0.

According to the example in FIG. 6, an input image is decomposed into a high-frequency component H and a low-frequency component L at a decomposition level 1. The low-frequency component L obtained at the decomposition level 1 is further decomposed into a high-frequency component LH and a low-frequency component LL at a decomposition level 2. The low-frequency component LL obtained at the decomposition level 2 is further decomposed into a high-frequency component LLH and a low-frequency component LLL at a decomposition level 3. Thus, finally, four band components LLL, LLH, LH, and H are obtained.

Band division can be achieved by, for example, a 2-divided filter bank. FIG. 7 shows an exemplary configuration of a 2-divided filter bank group to achieve 1-dimensional DWT. In the example in FIG. 7, the 2-divided filter bank is configured by a low-pass filter $H_0(z)$ that passes a low-frequency component, a high-pass filter $H_1(z)$ that passes a high-frequency component, and down samplers provided on the downstream sides of the filters $H_0(z)$ and $H_1(z)$. Herein, the down sampler thins every other input signal to halve a signal length, and outputs the signals. The 1-dimensional DWT is achieved by repeatedly using the 2-divided filter bank.

Figure 10:
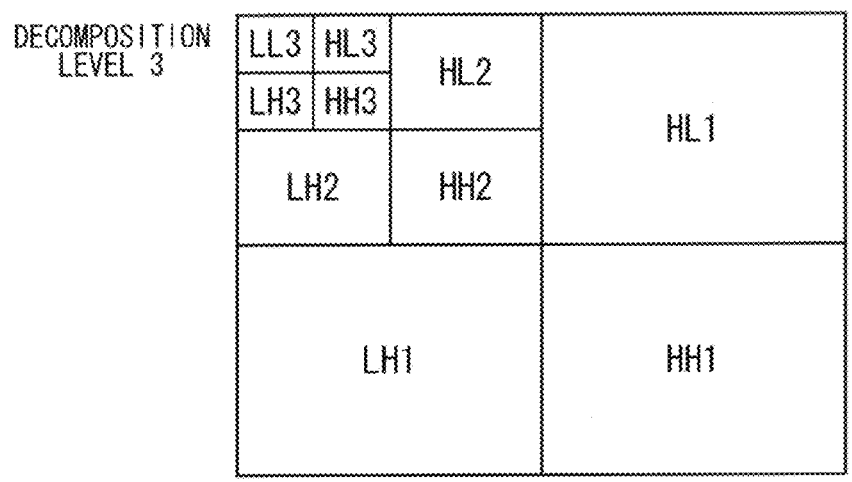
FIG. 10 is a diagram for explaining a mallat-type wavelet plane (decomposition level 3)

FIGS. 8 to 10 show a mallat-type wavelet plane about 2-dimensional wavelet transformation. According to the examples in FIGS. 8 to 10, an input image (2-dimensional image) is vertically and horizontally frequency-divided at the decomposition level 1 (see FIG. 8). In this manner, as shown in FIG. 8, the input image is divided into four band components HH1, HL1, LH1, and LL1. The frequency division can be achieved by vertically and horizontally applying, for example, the 1-dimensional filter illustrated in FIG. 7.

The band component LL1 obtained at the decomposition level 1 is further divided into four band components HH2, HL2, LH2, and LL2 at a decomposition level 2 (see FIG. 9). The band component LL2 obtained at the decomposition level 2 is further divided into four band components HH3, HL3, LH3, and LL3 at a decomposition level 3 (see FIG. 10). Note that, the set value of the decomposition level is not limited to 3.

In this case, with respect to a notation related to 2-dimensional wavelet transformation, for example, HL1 is a band component configured by a horizontal high-frequency component H and a vertical low-frequency component L at the decomposition level 1. The notation is generalized as "XYm" (Each of X and Y is one of H and L. m is an integer of 1 or more). Specifically, a band component configured by a horizontal band component X and a vertical band component Y at a decomposition level m is written as "XYm".

Moreover, for example, at the decomposition level 2 (see FIG. 9), the band component LL2, different from the other band components HH2, HL2, LH2, HH1, HL1, and LH1, is configured by only the low-frequency components L in both the horizontal direction and the vertical direction. In other words, each of the band components HH2, HL2, LH2, HH1, HL1, and LH1 includes a high frequency component H in the horizontal direction or/and the vertical direction. In consideration of this point, it is assumed that the band component LL2 is called a low-frequency component at the decomposition level 2 and that other band components HH2, HL2, LH2, HH1, HL1, and LH1 are called high-frequency components at the decomposition level 2. Specifically, at the decomposition level m, a band component LLm is called a low-frequency component, and band components other than the band component LLm are called high-frequency components.

Moreover, for example, at a decomposition level 1, the band component LL1 corresponds to essential information of the image. Moreover, the band component HL1 corresponds to information of an edge extending in the vertical direction, and the band component LH1 corresponds to information of an edge extending in the horizontal direction. Moreover, the band component HH corresponds to information of an edge extending in an oblique direction. Moreover, according to the band component LL1, an image having a size that is ¼ the image obtained before the decomposition can be provided.

The same is applied to other decomposition levels. For example, the band components LL2, HL2, LH2, and HH2 at the decomposition level 2 have the same relationship as that of the band components LL1, HL1, LH1, and HH1 obtained when the band component LL1 obtained before the division is regarded as an original image.

Figure 11:
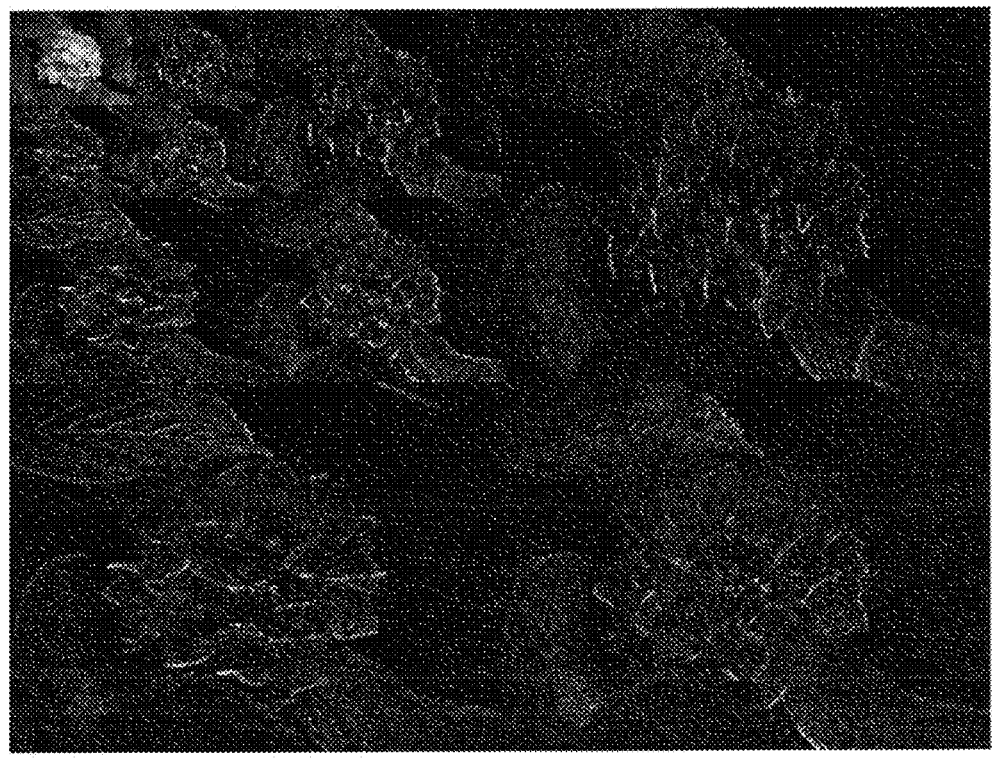
FIG. 11 is a diagram showing a wavelet plane obtained by performing wavelet transformation on the image in FIG. 1 (decomposition level 3)

FIG. 11 shows a wavelet plane obtained when wavelet transformation at the decomposition level 3 is performed on the image in FIG. 1.

The wavelet plane is a conceptual plane in which calculation result data of wavelet transformation is associated with an arrangement of pixels in an original image. For example, in a region shown as the band component LL1 in the wavelet plane, calculation result data (LL component data) obtained by using pixels in the original image as pixels of interest are arranged while corresponding to the positions of the pixels of interest in the original image.

The preferred embodiment is conveniently described by using a wavelet plane. However, the first image data 21 (see FIG. 5) can be widely defined regardless of an actual data array order. Specifically, a set of data obtained by performing wavelet transformation on the original image data 20 corresponds to the first image data 21. In other words, the wavelet plane is an example of the expressive form of the first image data 21. This point is also applied to image data 22 and 23 (will be described later).

<IWT Unit 14>

An IWT unit 14 will be described below. The IWT unit 14 performs inverse wavelet transformation (in this case, inverse discrete wavelet transformation (IDWT)) on input image data. According to the inverse wavelet transformation, a low-frequency component and a high-frequency component divided by the wavelet transformation are synthesized with each other. This synthesis is also called frequency synthesis, band synthesis, or the like. Herein, the inverse wavelet transformation may be simply called inverse transformation. In contrast to this, the wavelet transformation may be called forward transformation.

In the image processing apparatus 10, second image data 22 corresponding to the first image data 21 processed by the high-frequency cutting unit 12 and the low-frequency blurring unit 13 is input to the IWT unit 14. It is assumed that image data obtained by performing inverse wavelet transformation on the second image data 22 is called third image data 23. Herein, the second image data 22 may be abbreviated as image data 22, and the third image data 23 may be abbreviated as image data 23.

Figure 12:
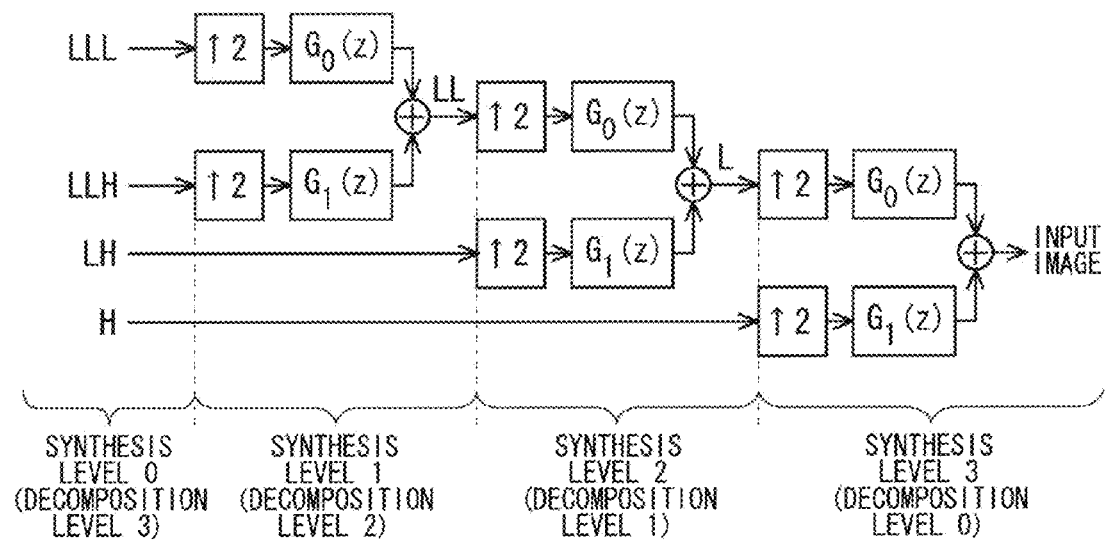
FIG. 12 is a diagram illustrating a 2-divided filter bank group to achieve 1-dimensional ID WT.

The IWT unit 14 can be configured by a conventional technique, for example, the technique described in Japanese Patent Application Laid-Open No. 2003-248673. FIG. 12 shows an exemplary configuration of a 2-divided filter bank group to achieve 1-dimensional IDWT. In the example in FIG. 12, the 2-divided filter bank is configured by a low-pass filter $G_0(z)$ that passes a low-frequency component, a high-pass filter $G_1(z)$ that passes a high-frequency component, up samplers provided on the upstream sides of the filters $G_0(z)$ and $G_1(z)$, and an adder that adds outputs from the filters $G_0(z)$ and $G_1(z)$ to each other. Herein, the up sampler inserts a zero value between input signals to double a signal length, and outputs the signals. The 1-dimensional IDWT is achieved by repeatedly using the 2-divided filter bank.

The number of times of synthesis in the inverse wavelet transformation is called a synthesis level. Note that, the synthesis level is not limited to the example in FIG. 12. It is assumed that a synthesis level in a state before the inverse wavelet transformation (in the example in FIG. 12, a state in which a band component is divided into the four band components LLL, LLH, LH, and H) is expressed as 0.

According to the example in FIG. 12, the four band components LLL, LLH, LH, and H are input to the 2-divided filter bank group. At a synthesis level 1, the band component LLL is input to the low pass filter $G_0(z)$ through the up sampler, the band component LLH is input to the high-pass filter $G_1(z)$ through the up sampler, and outputs from the two filters $G_0(z)$ and $G_1(z)$ are added to each other by an adder. In this manner, the band components LLL and LLH are synthesized with each other to generate the band component LL.

At the next synthesis level 2, the band component LL obtained at the synthesis level 1 is input to the low-pass filter $G_0(z)$ through the up sampler, the band component LH is input to the high-pass filter $G_1(z)$ through the up sampler, and outputs from the two filters $G_0(z)$ and $G_1(z)$ are added to each other by an adder. In this manner, the band components LL and LH are synthesized with each other to generate the band component L.

At a synthesis level 3, the band component L obtained at the synthesis level 2 is input to the low pass filter $G_0(z)$ through the up sampler, the band component H is input to the high-pass filter $G_1(z)$ through the up sampler, and outputs from the two filters $G_0(z)$ and $G_1(z)$ are added to each other by an adder. In this manner, the band components L and H are synthesized with each other to generate an image having the decomposition level 0.

In this case, according to the examples (i.e., set values of decomposition levels are 3) in FIGS. 12 and 7, the state at the decomposition level 3 corresponds to the state at the synthesis level 0. A set of band components synthesized up to the synthesis level 1 corresponds to the state at the decomposition level 2, and a set of band components synthesized up to the synthesis level 2 corresponds to the state at the decomposition level 1. Then, an image having the decomposition level 0 is obtained by synthesis at the synthesis level 3.

In integer-type DWT, as the digital filters $H_0(z)$, $H_1(z)$, $G_0(z)$, and $G_1(z)$ (see FIGS. 12 and 7), a reversible-type or an integer-type 5×3-tap filters are frequently used. In real-number-type DWT, a 9×7-tap filter is frequently used.

<ROI Developing Unit 15>

An ROI developing unit 15 will be described below. The ROI developing unit 15 acquires ROI information 30 and develops in other words, applies the ROI information 30 to the first image data 21.

The ROI information 30 is information in which a region of interest (ROI) serving as an unblurred region and a region of non-interest (non-ROI) serving as a blurred region are regulated in an original image. Considering that one of the ROI and the non-ROI can be specified to make it possible to specify the other, the ROI information 30 can be configured by at least one of information to specify the ROI and information to specify the non-ROI.

Figure 13:
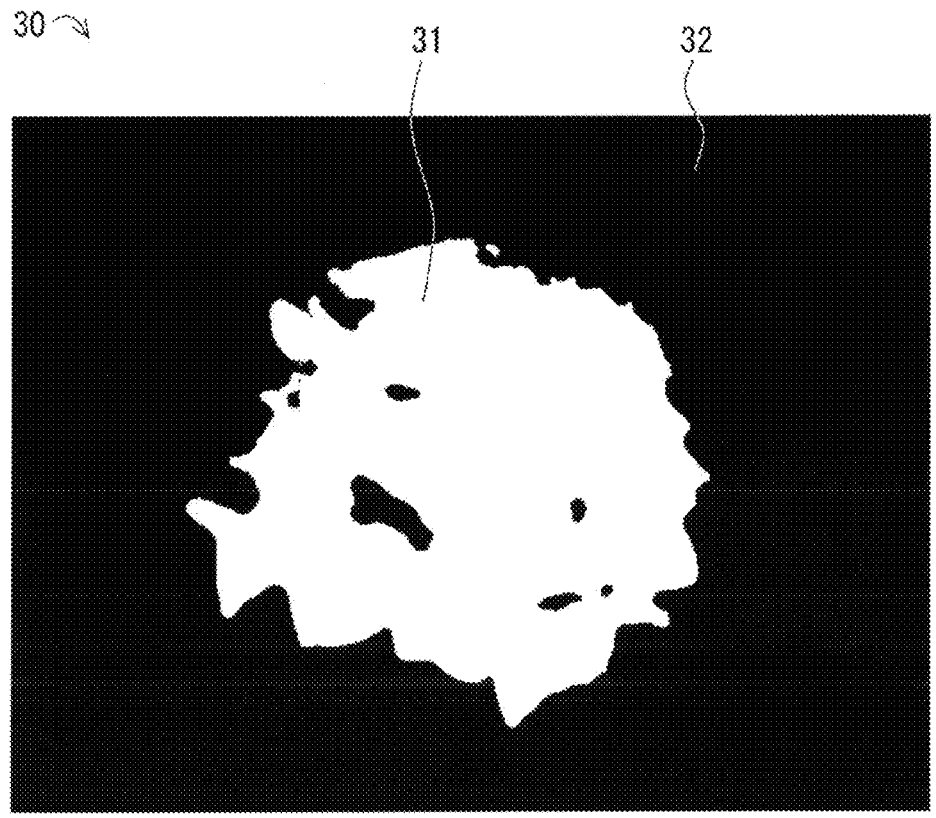
FIG. 13 is a diagram illustrating ROI information.

When the blurred image in FIG. 3 is generated, the ROI information 30 corresponding to the original image in FIG. 1 can be provided by an image (in other words, image data) having the same size as that of the original image as shown in FIG. 13. In an example in FIG. 13, a void region 31 is an ROI, and a black region 32 is a non-ROI.

In the example in FIG. 13, an operator can set the ROI 31 with a pointing input device such as a mouse while viewing an original image displayed on a screen. Alternatively, the ROI 31 may be automatically set by analyzing image data. For example, the original image data 20 may be analyzed to extract region including the color of a flower in the original image as the ROI 31. Alternatively, a foreground (in this case, a flow region) may be set in the ROI 31 by applying a technique of separating the foreground from a background. Herein, a large number of techniques of separating foregrounds from backgrounds are developed, and for example, a technique described in Japanese Patent Application Laid-Open No. 2011-34178 is illustrated. When the ROI 31 is set, the remaining region becomes a non-ROI 32. In this case, the non-ROI 32 is also set to make it possible to set the ROI 31.

In this manner, the ROI 31 and the non-ROI 32 can be set by various methods. Then, the ROI information 30 prepared as described above is input to the ROI developing unit 15.

The ROI developing unit 15, based on the acquired ROI information 30, specifies an ROI corresponding portion corresponding to the ROI 31 and a non-ROI corresponding portion corresponding to the non-ROI 32 to the first image data 21. In this manner, the ROI information 30 is developed in the first image data 21. It is assumed that the ROI information 30 developed in the first image data 21 is called developed ROI information.

Figure 14:
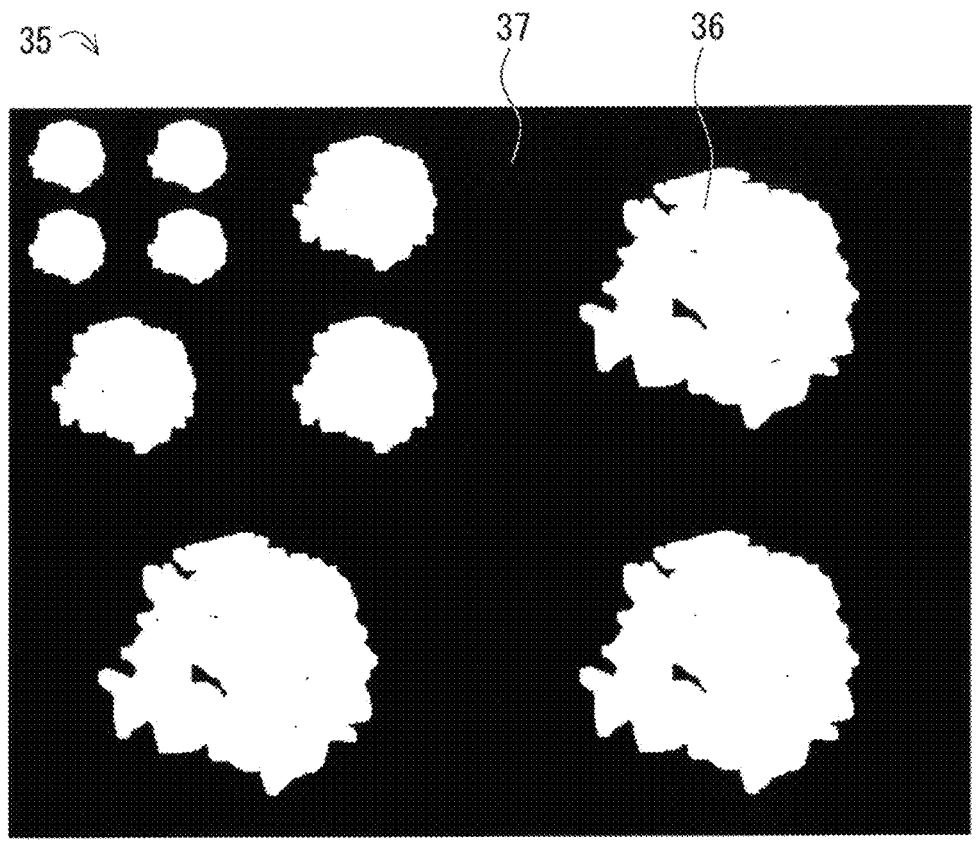
FIG. 14 is a diagram illustrating developed ROI information.

FIG. 14 illustrates developed ROI information 35 to the first image data 21 of the decomposition level 3. In FIG. 14, in order to easily understand the explanation, the developed ROI information 35 is visualized while being caused to correspond to the wavelet plane (see FIG. 10). In FIG. 14, a void region 36 is an ROI corresponding portion, and a black region 37 is a non-ROI corresponding portion.

The developed ROI information 35 need not be configured in accordance with the wavelet plane. Specifically, as long as the developed ROI information 35 can specify to which of the ROI 31 and the non-ROI 32 each data configuring the first image data 21 corresponds, the developed ROI information 35 can be configured by an arbitrary data array structure, a signal format, or the like.

Generation of the developed ROI information 35 can be configured by a conventional technique, for example, the technique described in Japanese Patent Application Laid-Open No. 2002-94991.

Figure 15:
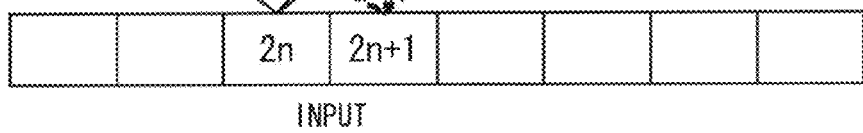
FIG. 15 is a diagram illustrating development of ROI information when wavelet transformation is performed by using a 5×3 filter.

For example, when a 5×3 filter is used in a calculation process of wavelet transformation, as shown in FIG. 15, the ROI information 30 can be developed. In the 5×3 filter, a low-pass filter on the decomposition side is a 5-tap low-pass filter, and a high-pass filter on the decomposition side is a 3-tap high-pass filter.

As shown in FIG. 15, when an even-number-th (expressed as 2nth when n is an integer) pixel (in other words, pixel data) of an original image is included in the ROI 31, nth data on a low-frequency component (referring to the example in FIG. 7, of data output from the down sampler on the low-pass filter side) is set to the ROI corresponding portion 36. Further, on the high-frequency component, {n−1}th and nth data (referring to the example in FIG. 7, of data output from the down sampler on the high-pass filter side) are set to the ROI corresponding portion 36.

On the other hand, when an odd-number-th (expressed as {2n+1}th) pixel of the original image is included in the ROI 31, the nth and {n+1}th data on the low-frequency component and the {n−1}th, nth, and {n+1}th data on the high-frequency component are set in the ROI corresponding portion 36.

Note that, FIG. 15 illustrates a correspondence between the original image and the wavelet plane at the decomposition level 1. However, recursive development to a deeper level is also understood.

Moreover, for example, when a Daubechies 9×7 filter is used in a calculation process of wavelet transformation, as shown in FIG. 16, the ROI information 30 can be developed. In the Daubechies 9×7 filter, the low-pass filter on the decomposition side is a 9-tap low-pass filter, and a high-pass filter on the decomposition side is a 7-tap high-pass filter.

As shown in FIG. 16, when an even-number-th (expressed as 2nth) pixel of the original image is included in the ROI 31, the {n−1}th, nth, and {n+1}th data on the low-frequency component and the {n−2}th, {n−1}th, nth, and {n+1}th data on the high-frequency component are set to the ROI corresponding portion 36. On the other hand, when an odd-number-th (expressed as {2n+1}th) pixel of the original image is included in the ROI 31, the {n−1}th, nth, {n+1}th, and {n+2}th data on the low-frequency component and the {n−2}th, {n−1}th, nth, {n+1}th, and {n+2}th data on the high-frequency component are set to the ROI corresponding portion 36. Note that, FIG. 16 illustrates a correspondence between the original image and the wavelet plane at the decomposition level 1. However, recursive development to a deeper level is also understood.

As is apparent from the examples in FIGS. 15 and 16, the development of the ROI information 30, i.e., the generation of the developed ROI information 35 depends on the number of taps of a filter for wavelet transformation.

The generated developed ROI information 35 is supplied to the high-frequency cutting unit 12 and the low-frequency blurring unit 13 and used as a mask in the processes in the high-frequency cutting unit 12 and the low-frequency blurring unit 13.

<High-Frequency Cutting Unit 12>

The high-frequency cutting unit 12 acquires the first image data 21 and the developed ROI information 35. The high-frequency cutting unit 12 performs, on the first image data 21, a high-frequency cutting process that cuts the high-frequency component of the non-ROI corresponding portion 37. In this case, the non-ROI corresponding portion 37 can be understood from the developed ROI information 35.

Specifically, the high-frequency cutting unit 12, in the first image data 21, cuts data included both in the high-frequency components HL, LH, and HH (in other words, components except for the low-frequency component LL) and in the non-ROI corresponding portion 37.

The high-frequency cutting process is, for example, a process of setting the value of corresponding data to 0. Alternatively, for example, a process of setting the value of the corresponding data to a value except for 0 may be employed. In this regard, when the value of the corresponding data is set to 0, distortion or the like can be suppressed from occurring in a blurred image, and a high-quality blurred image can be obtained. By various processes except for the process of setting the corresponding data to a specific value, the high-frequency cutting process may be performed.

<Low-Frequency Blurring Unit 13>

The low-frequency blurring unit 13, in the example in FIG. 5, acquires the first image data 21 obtained after the high-frequency cutting process is performed in the high-frequency cutting unit 12. In addition, the low-frequency blurring unit 13 acquires the developed ROI information 35. The low-frequency blurring unit 13 performs, on the acquired first image data 21, a low-frequency blurring process that is a process of blurring the low-frequency component of the non-ROI corresponding portion 37.

Specifically, the low-frequency blurring unit 13, in the first image data 21, performs a blurring process on data included both in the low-frequency component LL and in the non-ROI corresponding portion 37.

As the low-frequency blurring process, for example, a filter having a blurring operator may be used. As such a filter, a low-pass filter is illustrated. More specifically, a smoothing filter (also called an averaging filter) and a Gaussian filter are illustrated.

According to the smoothing filter, data of a position of interest (may be expressed as a pixel of interest) on a wavelet plane and data around the position of interest are averaged, and the obtained average value is employed as the data of the position of interest. According to the blurring operator of the 3×3 smoothing filter shown in FIG. 17, the data of the position of interest and the peripheral position are multiplied by predetermined rates (in this case, ⅑), and the multiplication values are summed up. In the blurring operator of a 5×5 smoothing filter shown in FIG. 18, the predetermined rate is 1/25.

In a general image, a brightness difference between pixels that are close to each other is small, and a brightness difference between pixels frequently increases when the distance between the pixels increases. Considering this point, a pixel may be weighted depending on a distance from a pixel of interest. As the weighting, a Gaussian distribution can be used. The Gaussian distribution can be expressed by the following equation.

$$f(x, y) = \frac{1}{2\pi\sigma^2}\exp\left(-\frac{x^2 + y^2}{2\sigma^2}\right) \quad \text{[Equation 1]}$$

In the Gaussian filter, weighting by a Gaussian distribution is used as the predetermined rate. For this reason, a smoothing effect decreases when a value σ in the equation is small. In contrast to this, the smoothing effect increases when the value σ increases. FIG. 19 shows a blurring operator of a 3×3 Gaussian filter, and FIG. 20 shows a blurring operator of a 5×5 Gaussian filter.

The low-frequency blurring process can also be performed by using a configuration different from a so-called filter such as a smoothing filter. When the low-frequency component LL is illustrated, a process of further recursively performing wavelet transformation on the low-frequency component LL, performing a high-frequency cutting process on a high-frequency component of the obtained image data, and, thereafter, performing inverse wavelet transformation may be applied as a low-frequency blurring process. The low-frequency blurring process may be performed by using the WT unit 11, the high-frequency cutting unit 12, and the IWT unit 14. According to the process in the example, even though a filter is used in detail, as a whole, the configuration is different from a configuration using a so-called filter such as a smoothing filter.

A decomposition level (in other words, the number of times of execution of wavelet transformation and inverse wavelet transformation) of wavelet transformation in the low-frequency blurring process can be set independently of a decomposition level obtained when the original image data 20 is wavelet-transformed. Moreover, the high-frequency cutting process in the low-frequency blurring process may be the same as a high-frequency cutting process to the image data 21 supplied from the WT unit 11, or different from the high-frequency cutting process to the image data 21.

The first image data 21 obtained after the low-frequency blurring process is performed (more specifically, after the high-frequency cutting process and the low-frequency blurring process are performed) is supplied to the IWT unit 14 as second image data 22.

In this case, in the example in FIG. 5, a third image data 23 obtained after the inverse wavelet transformation is supplied from the IWT unit 14 to the low-frequency blurring unit 13. The low-frequency blurring unit 13 also performs the same low-frequency blurring process on the image data 23 to output the processed image data 22 to the IWT unit 14.

<Process Flow>

Figure 21:
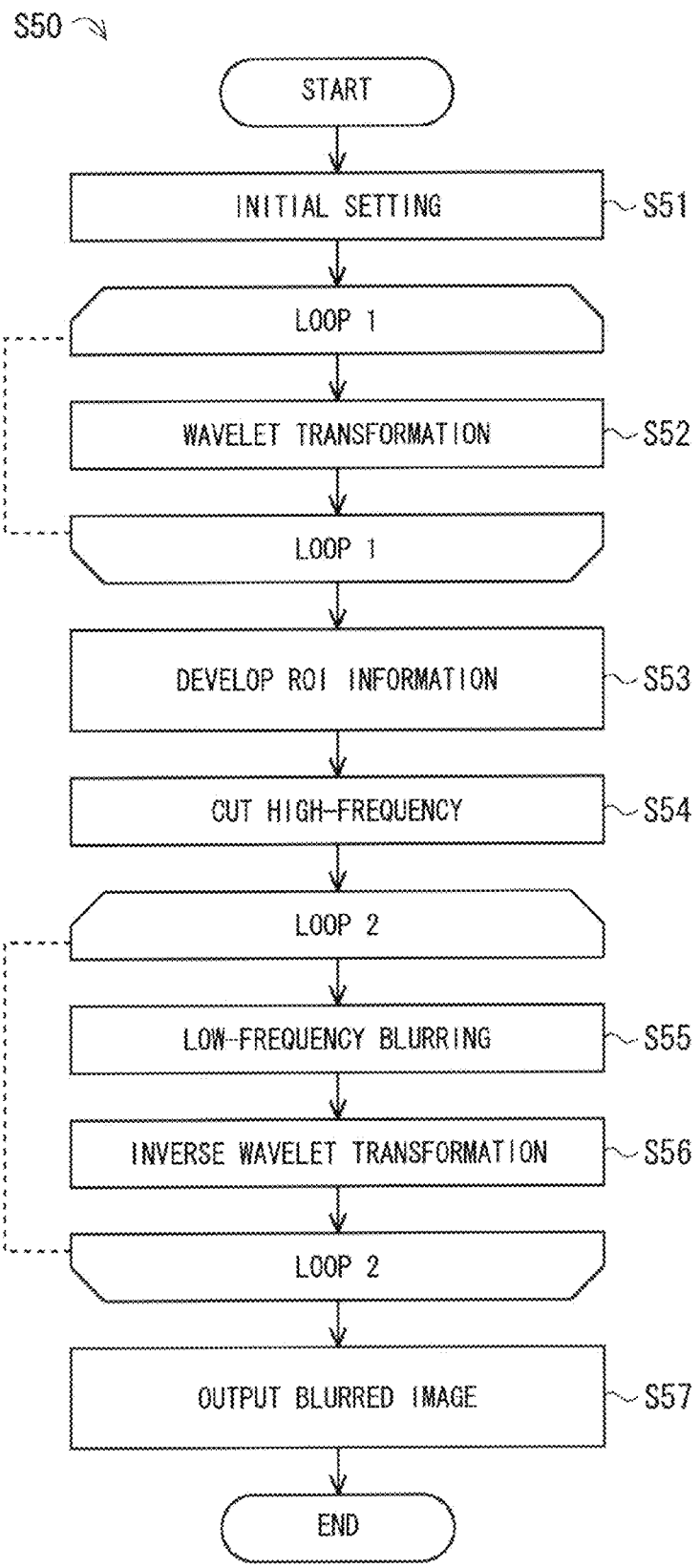
FIG. 21 is a flow chart illustrating an image processing method.

FIG. 21 illustrates a flow chart of a process flow (in other words, an image processing method) S50 in the image processing apparatus 10.

According to process flow S50, in step S51, an initial setting is performed. For example, the original image data 20 is input to the WT unit 11, and a set value of a decomposition level of wavelet transformation is input to the WT unit 11 and the ROI developing unit 15, and the ROI information 30 is input to the ROI developing unit 15.

However, the data and the like need only be supplied before the process is actually executed. Step S52 is executed after the step S51.

In step S52, the WT unit 11 performs wavelet transformation on the original image data 20. The WT unit 11 repeats step S52 the number of times given by a set value of a decomposition level (see loop 1 in FIG. 21). The original image data 20 becomes the first image data 21 supplied to the high-frequency cutting unit 12 by performing wavelet transformation up to the set decomposition level. Step S53 is executed after step S52.

In step S53, the ROI developing unit 15 develops (in other words, applies) the ROI information 30 to the first image data 21 to generate the developed ROI information 35. In this case, although step S53 is executed after step S52, step S53 may be executed before step S52. Furthermore, step S53 may be executed in parallel with step S52. Step S54 is executed after step S53.

In step S54, the high-frequency cutting unit 12 acquires the first image data 21 from the WT unit 11, acquires the developed ROI information 35 from the ROI developing unit 15, and performs a high-frequency cutting process on the first image data 21 based on the developed ROI information 35. Step S55 is executed after step S54.

In step S55, the low-frequency blurring unit 13 acquires the first image data 21 obtained after the high-frequency cutting process from the high-frequency cutting unit 12, acquires the developed ROI information 35 from the ROI developing unit 15, and performs a low-frequency blurring process on the first image data 21 based on the developed ROI information 35. Step S56 is executed after step S55.

In step S56, the IWT unit 14 acquires the second image data 22 corresponding to the first image data 21 obtained after the low-frequency blurring process is performed (more specifically, after the high-frequency cutting process and the low-frequency blurring process are performed) from the low-frequency blurring unit 13, and performs inverse wavelet transformation on the second image data 22.

In this case, in step S56, the IWT unit 14 performs inverse wavelet transformation once (in other words, the decomposition level is returned by 1 stage), and supplies the obtained image data to the low-frequency blurring unit 13 as the third image data 23. Then, the low-frequency blurring unit 13 performs the low-frequency blurring process, based on the developed ROI information 35, on the third image data 23 acquired from the IWT unit 14 (step S55). Specifically, steps S55 and S56 are repeated (see loop 2 in FIG. 21).

More specifically, when the decomposition level is 3 (see FIG. 10), a low-frequency blurring process is performed on the low-frequency component LL3, and the low-frequency component LL3 obtained after the low-frequency blurring process and the high-frequency components HL3, LH3, and HH3 obtained after the high-frequency cutting process are synthesized with each other. The synthesis generates the low-frequency component LL2 (see FIG. 9). Then, the decomposition level is returned to 2.

Subsequently, the low-frequency blurring process is performed on the low-frequency component LL2, and the low-frequency component LL2 obtained after the low-frequency blurring process and the high-frequency components HL2, LH2, and HH2 obtained after the high-frequency cutting process are synthesized with each other. The synthesis generates the low-frequency component LL1 (see FIG. 8). Then the decomposition level is returned to 1.

Furthermore, the low-frequency blurring process is performed on the low-frequency component LL1, and the low-frequency component LL1 obtained after the low-frequency blurring process and the high-frequency components HL1, LH1, and HH1 obtained after the high-frequency cutting process are synthesized with each other. By the synthesis, the image data 23 having the decomposition level 0 is obtained.

When the image data 23 having the decomposition level 0 is obtained, repeating of steps S55 and S56 is ended. Specifically, steps S55 and S56 are repeated the number of times equal to the value of a decomposition level set in step S51. Specifically, the number of times of synthesis is equal to the number of times of decomposition.

Figure 22:
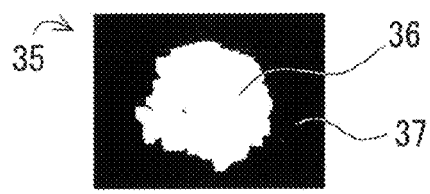
FIG. 22 is a diagram illustrating developed ROI information for a low-frequency component LL2.
Figure 23:
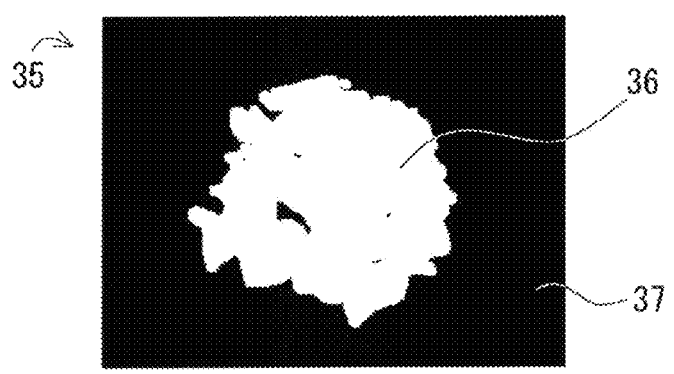
FIG. 23 is a diagram illustrating developed ROI information for a low-frequency component LL1.

When a low-frequency blurring process is performed on the low-frequency component LL2 having the decomposition level 2, the developed ROI information 35 for the low-frequency component LL2 (see FIG. 22) is required. With respect to this point, since the developed ROI information 35 having the same size as that of the low-frequency component LL2 has been generated in the middle of generation of the developed ROI information 35 for entire image data having the decomposition level 3 (see FIG. 14), the generated developed ROI information 35 may be used. Alternatively, when needed, the ROI developing unit 15 may generate the developed ROI information 35 for the low-frequency component LL2. This is also applied to the developed ROI information 35 for the low-frequency component LL1 having the decomposition level 1 (see FIG. 23).

After step S55 and step S56 are repeated, the generated image data 23 having the decomposition level 0 is output from the IWT unit 14 as blurred image data 29 in step S57.

In step S54, it is assumed that the high-frequency cutting process of the non-ROI corresponding portion 37 is performed on all the high-frequency components (at the decomposition level 3, HL3, LH3, HH3, HL2, LH2, HH2, HL1, LH1, and HH1) in the first image data 21. However, the high-frequency cutting process need only be performed not later than inverse wavelet transformation in step S56. For example, the high-frequency cutting process to the high-frequency components HL1, LH1, and HH1 need only be finished not later than inverse wavelet transformation from the decomposition level 1 to the decomposition level 0. Considering this point, the execution order of step S54 is not limited to the example. For example, step S54 may be executed after step S55, or may be executed in parallel with another step.

<Effect or the Like>

Figure 24:
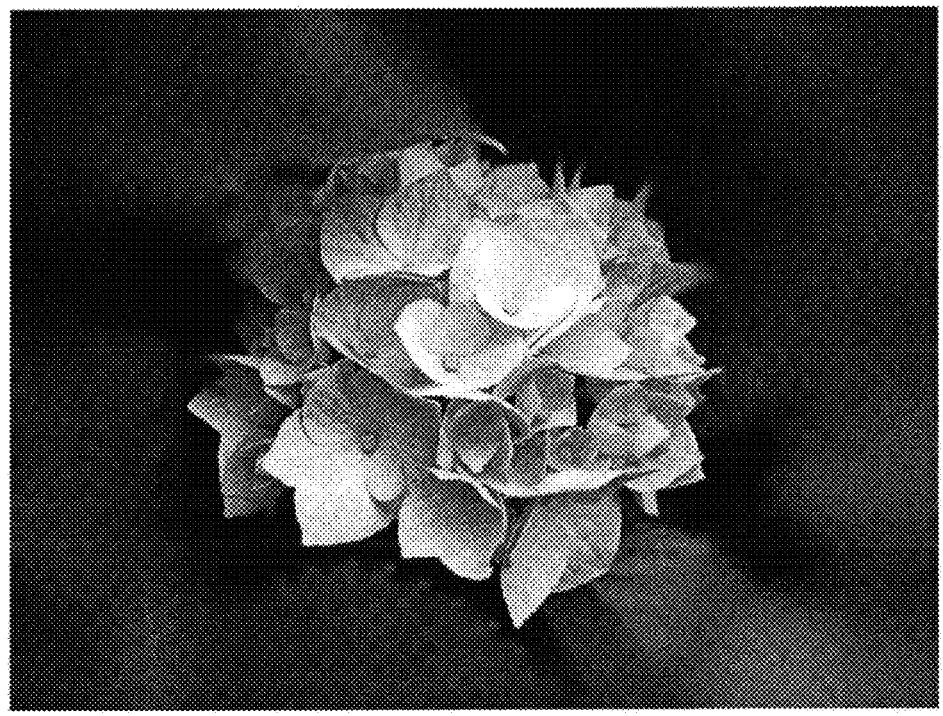
FIG. 24 is a diagram illustrating a blurred image (when a set value of a decomposition level is 6)
Figure 25:
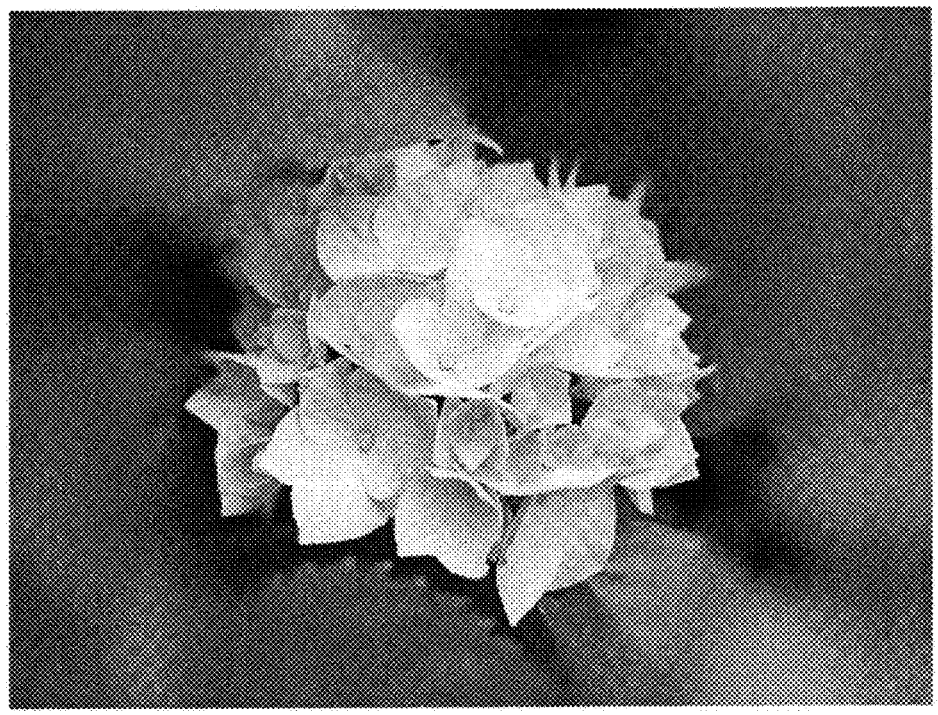
FIG. 25 is a diagram of an image obtained by adjusting the brightness of the blurred image in FIG. 24.

According to the image processing apparatus 10 and an image processing method S50, a high-quality blurred image as shown in FIG. 3 is obtained. A blur condition can be easily adjusted by controlling a decomposition level of wavelet transformation. FIG. 3 corresponds to the case in which a set value of a decomposition level is 3. FIG. 24 and FIG. 25 show a blurred image obtained when a set value of a decomposition level is 6. FIG. 25 is an image obtained by performing the same brightness adjustment as that in FIG. 2 on the image in FIG. 24.

Figure 26:
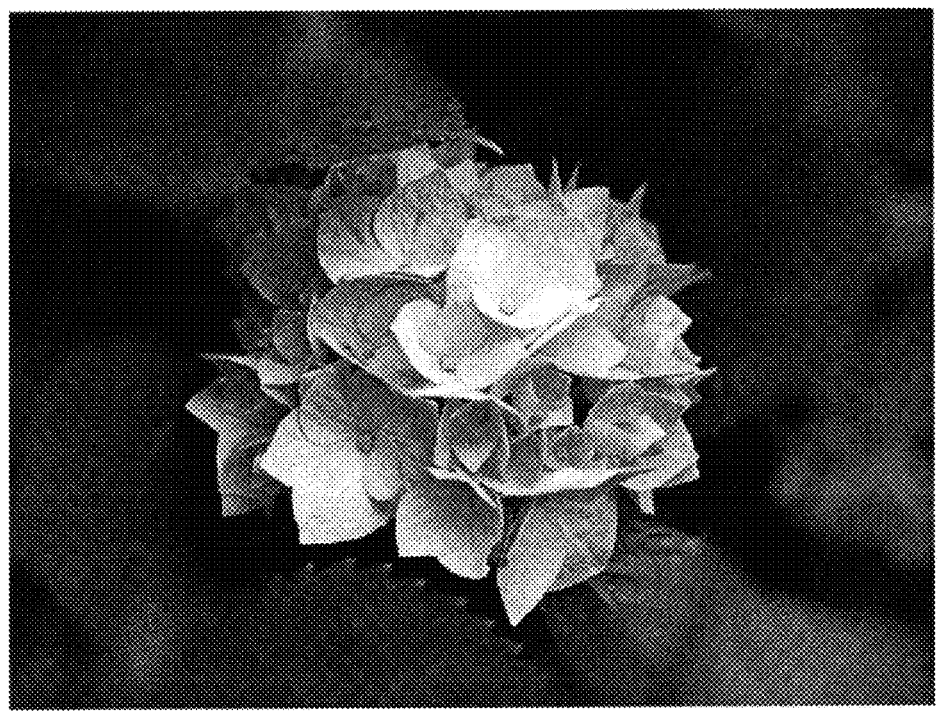
FIG. 26 is a diagram illustrating a blurred image (for comparison) when a low-frequency blurring process is not performed.

In this case, for comparison, FIG. 26 and FIG. 27 illustrate blurred images obtained when a low-frequency blurring process is not performed. FIG. 27 is an image obtained by performing the same brightness adjustment as that in FIG. 2 on the image in FIG. 26. According to FIG. 26 and FIG. 27, on the outside of a boundary between a flower region and a leaf region (specifically, on the leaf region side), in other words, on the outside of a boundary between an ROI and a non-ROI (specifically, on the non-ROI side), a degree of blurring is lower than those in FIG. 3 and FIG. 4. In other words, an unnatural blur condition is obtained. This is because data near the boundary of the ROI corresponding portion 36 of the low-frequency component LL3 influences the blur condition. Thus, the low-frequency blurring process is usefully employed.

The example in which the low-frequency blurring process and the inverse wavelet transformation are alternatively repeated is described above. In contrast to this, when the low-frequency blurring process is performed at least once, a blur condition that is natural more than that of the comparative image in FIG. 26 can be achieved. In other words, the number of times of execution of the low-frequency blurring process after the inverse wavelet transformation may be smaller than a set value of a decomposition level. By the control of the number of times, a degree of blurring can be adjusted.

Information related to the repeating of the low-frequency blurring process and the inverse wavelet transformation (specifically, information related to a specific decomposition level to which, for execution of the low-frequency blurring process, the decomposition level is returned) may be given to the IWT unit 14, for example, in step S51, as indicated by a dotted-line arrow in FIG. 5. Based on the information, the IWT unit 14 can determine whether the image data 23 is supplied to the low-frequency blurring unit 13 or the decomposition level is further returned by the inverse wavelet transformation without performing such data supply.

The image data 23 of the decomposition level 0 generated in the IWT unit 14 may be input to the low-frequency blurring unit 13 again. In this case, the third image data 23 of the decomposition level 0 is further applied with the low-frequency blurring process and becomes the blurred image data 29 corresponding to output image data (see a chained-line arrow in FIG. 5). According to the example, although an amount of calculation increases, the degree of blurring near the boundary between the ROI and the non-ROI can be made more moderate.

When the ROI information 30 is developed to the image data 21, it is preferred that a condition is satisfied in which the high-frequency cutting process and the low-frequency blurring process to the non-ROI corresponding portion 37 do not influence the ROI corresponding portion 36 of the image data 23 obtained after the inverse wavelet transformation (also including the blurred image data 29). The condition is satisfied to make it possible to prevent a portion in the ROI set in the original image from being blurred.

With respect to this point, in the ROI information 30 illustrated in FIG. 13, a shadow portion on a flower petal is set as a non-ROI. According to the condition, the developed ROI information 35 is given as shown in FIG. 14. Specifically, as apparent from FIG. 14, a non-ROI corresponding portion corresponding to the shadow portion decreases at a ratio lower than the reduction ratios of sizes for band components of the decomposition level 2 and the decomposition level 3, or disappears.

According to the developing methods illustrated by using FIG. 15 and FIG. 16, the ROI information 30 can be developed to the image data 21 in accordance with the condition. According to a method except for the methods in the examples, in the first image data 21, there may be generated data that becomes the ROI corresponding portion 36 in association with one pixel in the original images but becomes the non-ROI corresponding portion 37 in association with another pixel in the original image. However, in such a case, data that becomes the ROI corresponding portion in association with any one of pixels may be set to the ROI corresponding portion regardless of association with other pixels.

In the example of the above description, the number of times of execution of inverse wavelet transformation (specifically, the number of times of synthesis) is equal to the number of times of execution of wavelet transformation (specifically, the number of times of decomposition). In this case, a blurred image is generated in the same size as that of the original image.

In contrast to this, the number of time of synthesis may be smaller than the number of times of decomposition. In this case, the blurred image has a size depending on the number of time of synthesis. For example, when the number of times of decomposition is 3 and the number of time of synthesis is 2, the low-frequency component LL1 of the decomposition level 1 (see FIG. 8) can be output as the blurred image data 29. For this reason, a blurred image having a size ¼ the size of the original image is obtained.

In this manner, by using the low-frequency component LL of the third image data 23 having a decomposition level except for the decomposition level 0, the size of the blurred image can be easily adjusted. An output size of a blurred image can be set by, for example, a synthesis level (in other words, the number of times of synthesis), and the set value, for example, in step S51, may be given to the IWT unit 14 as indicated by a dotted-line arrow in FIG. 5.

In the image processing apparatus 10 and the image processing method S50, a blurred image is generated by using wavelet-transformed image data. In contrast to this, a non-ROI may be blurred without changing original image data. For example, an enlarged part of a blurred image generated by applying a filter having a blurring operator to the non-ROI of the original image is shown in FIG. 28. The same part as described above in the blurred image generated by the image processing apparatus 10 and the image processing method S50 is shown in FIG. 29. FIG. 29 is an image obtained when the numbers of times of decomposition and synthesis are 1.

When the blurring operator is applied without changing the original image, a difference between the ROI and the non-ROI becomes outstanding near the boundary between the ROI and the non-ROI. For this reason, the enlarged image becomes unnatural (see FIG. 28). For this reason, a filter to blurring the boundary is additionally required. In order to increase the degree of blurring, the number of taps of a filter may be increased, or a blurring operator may be repeatedly applied. However, an amount of calculation disadvantageously increases. Calculation itself performed without changing an original image size requires a large amount of calculation.

In this manner, according to the image processing apparatus 10 and the image processing method S50, in comparison with the case in which a blurring process is performed without changing an original image, a high-quality blurred image can be obtained.

The image processing apparatus 10 can be configured as, for example, a digital signal processor (DSP). In this case, circuits to achieve processes of various elements such as the WT unit 11 (in other words, functions corresponding to the processes) may be fixedly configured. Alternatively, a configuration in which basic elements and circuits are fixedly mounted and have programmable usage patterns may be used.

In the above description, the image processing method S50 is designed to be executed in the image processing apparatus 10. However, the image processing method S50 may be executed by an apparatus having a configuration different from that of the image processing apparatus 10.

The image processing method S50 can also be embodied as a program executed by a CPU (Central Processing Unit).

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus that generates a blurred image by partially blurring an original image, said image processing apparatus comprising:
    circuitry configured to
        perform wavelet transformation on original image data to generate first image data in which said original image data is decomposed into a low-frequency component and a high-frequency component up to a predetermined decomposition level,
        acquire ROI information in which a region of interest (ROI) serving as an unblurred region and a region of non-interest (non-ROI) serving as a blurred region are regulated in said original image,
        develop said ROI information for said original image to generate developed ROI information for said first image data, by specifying, based on said ROI information, an ROI corresponding portion in said first image data corresponding to said ROI in said original image and a non-ROI corresponding portion in said first image data corresponding to said non-ROI in said original image,
        perform, on said high-frequency component but not on said low-frequency component in said first image data, a high-frequency cutting process that cuts said high-frequency component of said non-ROI corresponding portion,
        perform, on said low-frequency component but not on said high-frequency component in said first image data, a low-frequency blurring process that blurs said low-frequency component of said non-ROI corresponding portion, and
        perform inverse wavelet transformation on second image data to generate third image data, said second image data corresponding to said first image data obtained after said high-frequency cutting process and said low-frequency blurring process are performed.

2. The image processing apparatus according to claim 1, wherein the circuitry is configured to
    acquire said third image data having a decomposition level that is not 0 at least once and perform said low-frequency blurring process on said third image data.

3. The image processing apparatus according to claim 1, wherein the circuitry is configured to
    acquire said third image data having a decomposition level 0,
    perform said low-frequency blurring process on said third image data, and
    output said third image data obtained after said low-frequency blurring process is performed as data of said blurred image.

4. The image processing apparatus according to claim 1, wherein the circuitry is configured to
    output said low-frequency component of said third image data having a decomposition level that is not 0 as data of said blurred image.

5. The image processing apparatus according to claim 1, wherein
said high-frequency cutting process is a process of setting a data value of said high-frequency component to 0.

6. The image processing apparatus according to claim 1, wherein the circuitry is configured to
perform said low-frequency blurring process by a filter.

7. The image processing apparatus according to claim 6 wherein
said filter is a smoothing filter or a Gaussian filter.

8. The image processing apparatus according to claim 1, wherein the circuitry is configured to
generate said developed ROI information for said first image data under a condition in which said high-frequency cutting process and said low-frequency blurring process with respect to said non-ROI corresponding portion do not influence an ROT portion of said third image data corresponding to said ROT in said original image.

9. The image processing apparatus according to claim 8, wherein the circuitry is configured to
perform said wavelet transformation by a 5×3 filter in which a 5-tap low-pass filter and a 3-tap high-pass filter are used on a decomposition side, and
generate said developed ROI information by performing at least
when a 2nth (n is an integer) pixel of said original image is included in said ROI, setting nth data on said low-frequency component and {n−1}th and nth data on said high-frequency component to said ROI corresponding portion, and
when a {2n+1}th pixel of said original image is included in said ROI, setting the nth and {n+1}th data on said low-frequency component and the {n−1}th, nth, and {n+1}th data on said high-frequency component to said ROI corresponding portion.

10. The image processing apparatus according to claim 8, wherein the circuitry is configured to
perform said wavelet transformation by a Daubechies 9×7 filter in which a 9-tap low-pass filter and a 7-tap high-pass filter are used on a decomposition side, and
generate said developed ROI information by performing at least
when a 2nth (n is an integer) pixel of said original image is included in said ROI, setting the {n−1}th, nth, and {n+1}th data on said low-frequency component and the {n−2}th, {n−1}th, nth, and {n+1}th data on said high-frequency component to said ROI corresponding portion, and
when a {2n+1}th pixel of said original image is included in said ROI, setting the {n−1}th, nth, {n+1}th, and {n+2}th data on said low-frequency component and the {n−2}th, {n−1}th, nth, {n+1}th, and {n+2}th data on said high-frequency component to said ROI corresponding portion.

11. The image processing apparatus according to claim 1, wherein the circuitry is configured to
perform said wavelet transformation by a 9×7 filter or a 5×3 filter.

12. The image processing apparatus according to claim 1, wherein the circuitry is configured to
perform said inverse wavelet transformation by a 9×7 filter or a 5×3 filter.

13. An image processing method that generates a blurred image by partially blurring an original image, said image processing method comprising:
performing wavelet transformation on original image data to generate first image data in which said original image data is decomposed into a low-frequency component and a high-frequency component up to a predetermined decomposition level;
acquiring ROI information in which a region of interest (ROI) serving as an unblurred region and a region of non-interest (non-ROI) serving as a blurred region are regulated in said original image;
developing said ROI information for said original image to generate developed ROI information for said first image data, by specifying, based on said ROI information, an ROI corresponding portion in said first image data corresponding to said ROI in said original image and a non-ROI corresponding portion in said first image data corresponding to said non-ROT in said original image;
performing, on said high-frequency component but not on said low-frequency component in said first image data, a high-frequency cutting process that cuts said high-frequency component of said non-ROI corresponding portion;
performing, on said low-frequency component but not on said high-frequency component in said first image data, a low-frequency blurring process that blurs said low-frequency component of said non-ROT corresponding portion; and
performing inverse wavelet transformation on second image data to generate third image data, said second image data corresponding to said first image data obtained after said high-frequency cutting process and said low-frequency blurring process are performed.

14. The image processing method according to claim 13, further comprising:
acquiring said third image data, generated in said inverse wavelet transformation and having a decomposition level that is not 0, at least once; and
performing said low-frequency blurring process on said third image data.

15. The image processing method according to claim 13, further comprising:
acquiring said third image data, generated in said inverse wavelet transformation and having a decomposition level 0;
performing said low-frequency blurring process on said third image data; and
providing said third image data obtained after said low-frequency blurring process is performed as data of said blurred image.

16. The image processing method according to claim 13, further comprising:
providing said low-frequency component of said third image data having a decomposition level that is not 0 as data of said blurred image.

17. The image processing method according to claim 13, wherein
said high-frequency cutting process is a process of setting a data value of said high-frequency component to 0.

18. The image processing method according to claim 13, wherein
said developed ROI information is generated under the condition in which said high-frequency cutting process and said low-frequency blurring process with respect to said non-ROI corresponding portion do not influence an ROI portion of said third image data corresponding to said ROI in said original image.

19. The image processing method according to claim 18, wherein said wavelet transformation is performed by a 5×3 filter in which a 5-tap low-pass filter and a 3-tap high-pass filter are used on a decomposition side, and generating said developed ROI information includes:

when a 2nth (n is an integer) pixel of said original image is included in said ROI, setting nth data on said low-frequency component and {n−1}th and nth data on said high-frequency component to said ROI corresponding portion, and when a {2n+1}th pixel of said original image is included in said ROI, setting the nth and {n+1}th data on said low-frequency component and the {n−1}th, nth, and {n+1}th data on said high-frequency component to said ROI corresponding portion.

20. The image processing method according to claim 18, wherein said wavelet transformation is performed by a Daubechies 9×7 filter in which a 9-tap low-pass filter and a 7-tap high-pass filter are used on a decomposition side, and generating said developed ROI information includes:

when a 2nth (n is an integer) pixel of said original image is included in said ROI, setting the {n−1}th, nth, and {n+1}th data on said low-frequency component and the {n−2}th, {n−1}th, nth, and {n+1}th data on said high-frequency component to said ROI corresponding portion, and when a {2n+1}th pixel of said original image is included in said ROI, setting the {n−1}th, nth, {n+1}th, and {n+2}th data on said low-frequency component and the {n−2}th, {n−1}th, nth, {n+1}th, and {n+2}th data on said high-frequency component to said ROI corresponding portion.

* * * * *